(12) United States Patent
Taniguchi et al.

(10) Patent No.: US 12,259,244 B2
(45) Date of Patent: Mar. 25, 2025

(54) INERTIAL SENSOR, ATOMIC INTERFEROMETER, METHOD FOR ADJUSTING SPEED AND COURSE OF ATOMIC BEAM, AND APPARATUS FOR ADJUSTING SPEED AND COURSE OF ATOMIC BEAM

(71) Applicants: JAPAN AVIATION ELECTRONICS INDUSTRY, LIMITED, Tokyo (JP); TOKYO INSTITUTE OF TECHNOLOGY, Tokyo (JP)

(72) Inventors: Kento Taniguchi, Tokyo (JP); Ryotaro Inoue, Tokyo (JP); Mikio Kozuma, Kanagawa (JP); Atsushi Tanaka, Tokyo (JP)

(73) Assignees: JAPAN AVIATION ELECTRONICS INDUSTRY, LIMITED, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 176 days.

(21) Appl. No.: 18/028,952

(22) PCT Filed: Jul. 12, 2021

(86) PCT No.: PCT/JP2021/026164
§ 371 (c)(1),
(2) Date: Mar. 28, 2023

(87) PCT Pub. No.: WO2022/074890
PCT Pub. Date: Apr. 14, 2022

(65) Prior Publication Data
US 2023/0332893 A1    Oct. 19, 2023

(30) Foreign Application Priority Data
Oct. 8, 2020   (JP) .................................. 2020-170503

(51) Int. Cl.
*G01C 19/72*     (2006.01)

(52) U.S. Cl.
CPC .................................. *G01C 19/721* (2013.01)

(58) Field of Classification Search
CPC ...... G01C 19/721; G01C 19/58; G01C 19/00; G01P 15/093; G01P 15/08
See application file for complete search history.

(56) References Cited

U.S. PATENT DOCUMENTS 11,614,318 B2    3/2023  Kozuma et al.
2002/0134931 A1*  9/2002  Hirano .................. G01N 23/00
                                                           250/251

(Continued)

FOREIGN PATENT DOCUMENTS

CN    1805650 A    7/2006
CN    102538775 A  7/2012

(Continued)

OTHER PUBLICATIONS

T. L. Gustavson et al., "Precision Rotation Measurements with an Atom Interferometer Gyroscope", Physical Review Letters, Mar. 17, 1997, pp. 2046-2049.

(Continued)

*Primary Examiner* — Tarifur R Chowdhury
*Assistant Examiner* — Kemaya Nguyen
(74) *Attorney, Agent, or Firm* — Greenblum & Bernstein, P.L.C.

(57) ABSTRACT

An adjuster performs simultaneous irradiation of M laser beams to an atomic beam, where M is a predetermined integer satisfying 3≤M. The course of each of the M laser beams intersects with an approach path of the atomic beam. A component, in a direction perpendicular to the approach path of the atomic beam, of the sum of radiation pressure vectors that the M laser beams respectively have is non-zero.

(Continued)

A component, in a direction of the approach path of the atomic beam, of the sum of the radiation pressure vectors that the M laser beams respectively have is negative for atoms having speeds greater than the predetermined speed, and positive for the atoms having speeds smaller than the predetermined speed.

15 Claims, 8 Drawing Sheets

(56) References Cited

U.S. PATENT DOCUMENTS

| | | | |
|---|---|---|---|
| 2014/0303931 A1* | 10/2014 | Suzuki | B82Y 10/00 |
| | | | 702/179 |
| 2016/0377436 A1 | 12/2016 | Compton et al. | |
| 2017/0229203 A1 | 8/2017 | Compton et al. | |
| 2018/0066942 A1 | 3/2018 | Compton | |
| 2020/0318968 A1* | 10/2020 | Kozuma | G01C 19/661 |
| 2020/0333139 A1 | 10/2020 | Kozuma et al. | |
| 2021/0233676 A1* | 7/2021 | Inoue | G01B 9/02015 |
| 2023/0011067 A1 | 1/2023 | Inoue et al. | |

FOREIGN PATENT DOCUMENTS

| | | |
|---|---|---|
| JP | 2017/015685 A | 1/2017 |
| JP | 2020/020636 A | 2/2020 |
| WO | WO2019/073655 A1 | 4/2019 |

OTHER PUBLICATIONS

T. Müller et al., "A Compact Dual Atom Interferometer Gyroscope Based on Laser-Cooled Rubidium", The European Physical Journal D, May 1, 2008, pp. 273-281.

International Search Report issued in WIPO family member application No. PCT/JP2021/026164, dated Aug. 10, 2021, together with an English translation.

U.S. Appl. No. 18/098,911 to Mikio Kozuma et al., filed Jan. 19, 2023.

U.S. Appl. No. 18/028,891 to Ryotaro Inoue et al., filed Mar. 28, 2023.

* cited by examiner

INERTIAL SENSOR, ATOMIC INTERFEROMETER, METHOD FOR ADJUSTING SPEED AND COURSE OF ATOMIC BEAM, AND APPARATUS FOR ADJUSTING SPEED AND COURSE OF ATOMIC BEAM

TECHNICAL FIELD

The present invention relates to an adjustment technique for making the speeds of atoms contained in an atomic beam close to a predetermined speed and bending the course of the atomic beam, and an atomic interference technique using the adjustment technique.

BACKGROUND ART

In recent years, with the advancement of laser technology, studies have been progressing on atomic interferometers, inertial sensors using atomic interference, etc. Examples of such atomic interferometers include a Mach-Zehnder atomic interferometer and a Ramsey-Bordé atomic interferometer (see, for example, Non-patent literature 1).

In the basic scheme of the Mach-Zehnder atomic interferometer, an atomic beam is irradiated with two moving standing light waves called $\pi/2$ pulses and one moving standing light wave called $\pi$ pulse. The interaction between the atomic beam and the moving standing light waves splits the atomic beam into two atomic beams, and further the two atomic beams intersect with each other. As a result, obtained is an atomic beam corresponding to the superposition state of an atomic state corresponding to one of the two atomic beams and an atomic state corresponding to the other atomic beam.

For example, when a Mach-Zehnder atomic interferometer receives an angular velocity within a plane containing two atomic beams of the Mach-Zehnder atomic interferometer, a phase difference occurs between the two atomic beams, and this phase difference is reflected to the existence probability of the atomic state corresponding to one of the two atomic beams and the existence probability of the atomic state corresponding to the other atomic beam. Therefore, the angular velocity can be detected by observing the atomic beam corresponding to the superposition state of the atomic state corresponding to one of the two atomic beams and the atomic state corresponding to the other atomic beam.

Further, there is known a configuration in which two counter-propagating atomic beams are irradiated with moving standing light waves in order to, for example, detect an angular velocity and an acceleration individually while the angular velocity in a plane containing two atomic beams and the acceleration in a direction substantially perpendicular to the traveling direction of the atomic beams in the plane are applied to the Mach-Zehnder atomic interferometer (see, for example, Non-patent literature 2).

PRIOR ART LITERATURE

Non-Patent Literature

Non-patent literature 1: T. L. Gustavson, P. Bouyer and M. A. Kasevich, "Precision Rotation Measurements with an Atom Interferometer Gyroscope," Phys. Rev. Lett. 78, 2046-2049, Published 17 Mar. 1997.

Non-patent literature 2: T. Muller, M. Gilowski, M. Zaiser, T. Wendrich, W. Ertmer, and E. M. Rasel, "A compact dual atom interferometer gyroscope based on laser-cooled rubidium," Eur. Phys. J. D 53, 273-281, 2009.

SUMMARY OF THE INVENTION

Problems to be Solved by the Invention

An atomic beam to be irradiated with the moving standing light waves is preferably a cold atomic beam that has a low speed in the traveling direction of the atomic beam, a narrow speed spread in a direction perpendicular to the traveling direction of the atomic beam, and a high flux.

With respect to cold atomic beams, it is generally known that the distribution in speed of atoms in the traveling direction of a cold atomic beam has a width of about 20% of the mode thereof, and when the mode of this distribution is 20 m/s, for example, this distribution has a width of about ±2 m/s.

Therefore, the interaction time between each of atoms contained in the atomic beam and the moving standing light wave varies among the atoms. This non-uniformity in interaction time causes a decrease in the number of atoms contributing to interference, which causes reduction in contract between the state of atoms corresponding to one of the two atomic beams and the state of atoms corresponding to the other atomic beam of atoms obtained from the atom interferometer.

Further, the difference in the population of atoms, the atoms being obtained from the atomic interferometer, between in the state corresponding to one of the two atomic beams and in the state corresponding to the other atomic beam is expressed by using a cosine function of phase dependent on the speeds of the atoms and the angular velocity applied to the atomic interferometer. When a sufficiently large angular velocity applied to the atom interferometer, atoms having various speeds within the width of the distribution in speed of atoms contribute to variation in the difference of the population as cosine functions of various phases, so that the cosine functions of the various phases cancel one another, and thereby the contrast is reduced. In other words, the width of the distribution in speed of atoms causes reduction in the dynamic range.

Therefore, it is desirable to reduce the width of the distribution in speed of atoms in the traveling direction of the cold atomic beam.

Further, in the configuration of irradiating two counter-propagating atomic beams with moving standing light waves, it is desirable to be capable of finely adjusting the courses of the atomic beams for the sake of making the two counter-propagating atomic beams move in opposite directions.

An object of the present invention is to provide an adjustment technique for making the speeds of atoms contained in an atomic beam close to a predetermined speed and bending the course of the atomic beam, and an atom interferometer and an inertial sensor which use the adjustment technique.

Means to Solve the Problems

Technical matters described in this section are neither intended to explicitly or implicitly limit inventions recited in the claims, nor intended to allow any person other than persons benefiting from the present inventions (for example, applicants and proprietors) to limit or construe in a limited sense the inventions recited in the claims, and are merely provided to facilitate understanding of the gist of the present invention. A general outline of the invention from other aspects can be appreciated, for example, from the claims as originally filed in the present patent application.

According to an adjustment technique disclosed here, an atomic beam is simultaneously irradiated with M laser beams, where M is a predetermined integer satisfying $3 \leq M$. The course of each of the M laser beams intersects with an approach path of the atomic beam. The M laser beams have their respective radiation pressure vectors and a component, in a direction perpendicular to the approach path of the atomic beam, of the sum of the radiation pressure vectors is non-zero. A component, in the approach path of the atomic beam, of the sum of the radiation pressure vectors is negative for atoms having speeds greater than the predetermined speed, and positive for atoms having speeds smaller than the predetermined speed.

Each of an atomic interferometer and an inertial sensor includes this adjustment technique.

Effects of the Invention

According to the adjustment technique of the present invention, the speeds of the atoms contained in the atomic beam approach the predetermined speed, and the course of the atomic beam can be bent. Also, according to the atom interferometer and inertial sensor of the present invention, the dynamic range is improved.

DETAILED DESCRIPTION OF THE EMBODIMENTS

Embodiments of the present invention will be described with reference to the drawings. Note that the drawings are for understanding the embodiments, and the dimensions of the illustrated component elements are different from actual dimensions.

Figure 1:
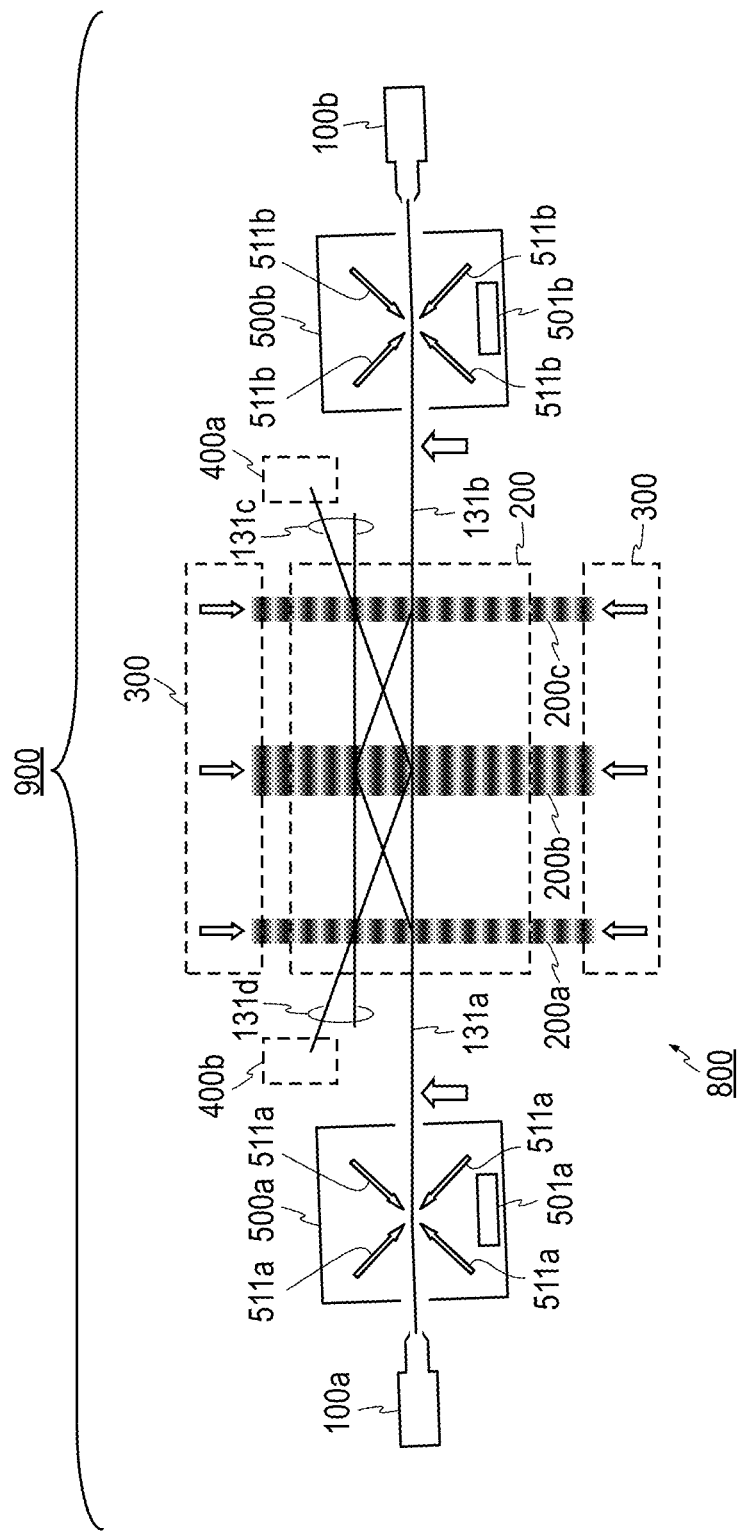
FIG. 1 is a configuration example of an atomic interferometer using an adjuster.
Figure 2:
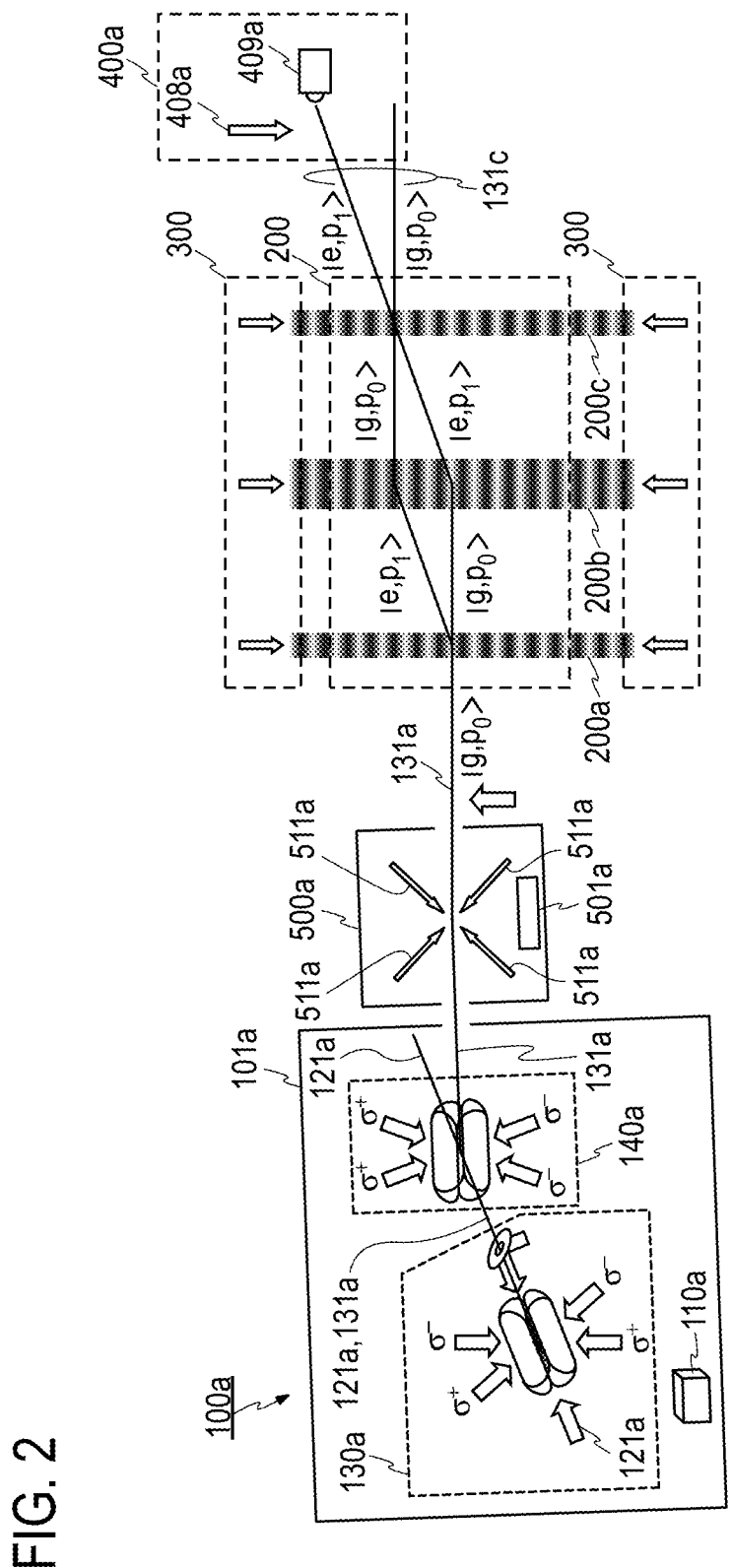
FIG. 2 is a partial detailed diagram of the configuration example of the atomic interferometer shown in FIG. 1.
Figure 3:
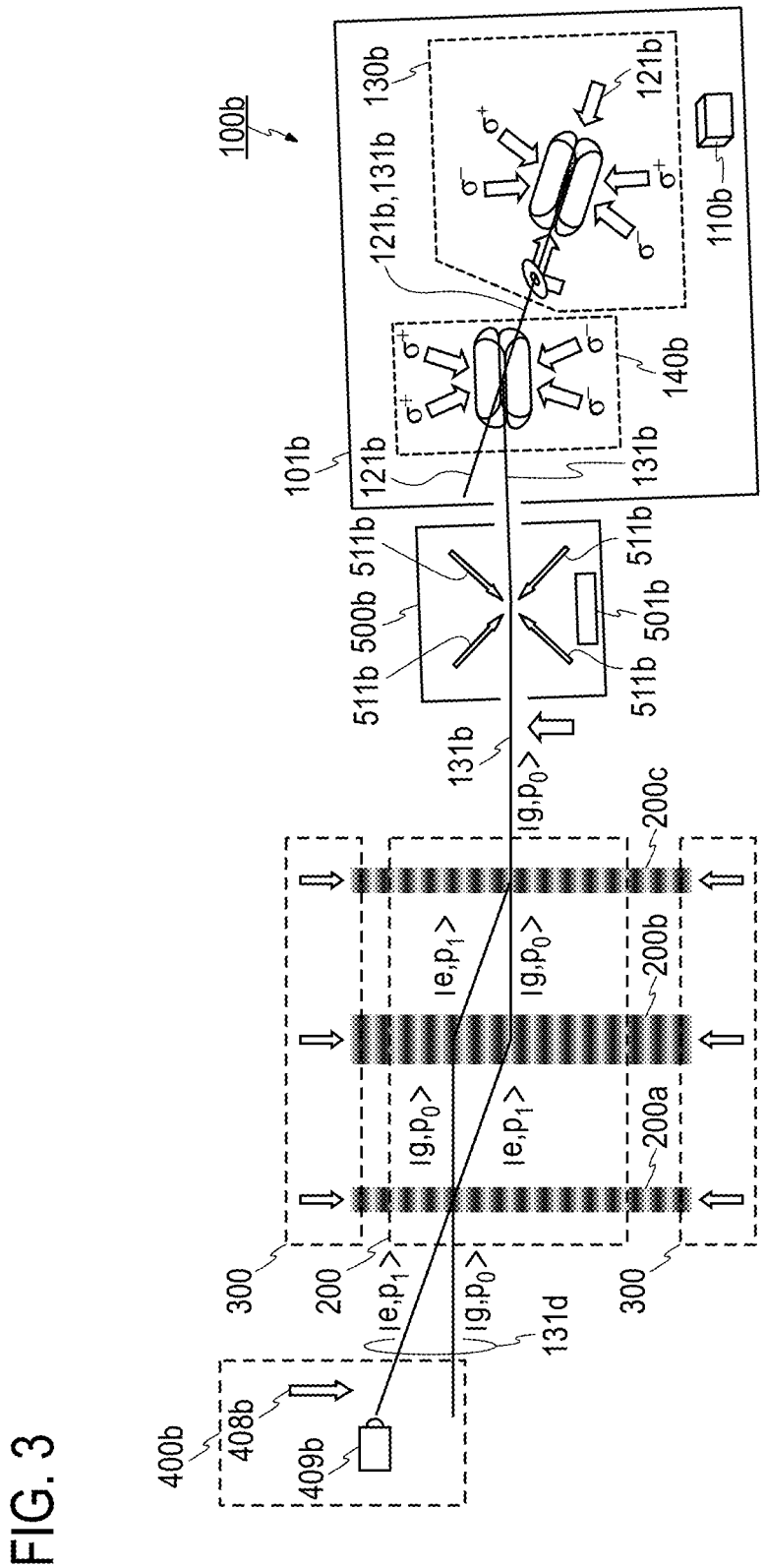
FIG. 3 is a partial detailed diagram of the configuration example of the atomic interferometer shown in FIG. 1.

An inertial sensor 900 including an exemplary Mach-Zehnder atomic interferometer 800 shown in FIGS. 1, 2 and 3 comprises cold atomic beam generation apparatuses 100a and 100b each for continuously generating a cold atomic beam having a narrow speed spread in a direction perpendicular to a traveling direction of the cold atomic beam, adjusters 500a and 500b each for making the speeds of atoms contained in the cold atomic beam close to a predetermined speed and bending the course of the cold atomic beam, a moving standing light wave generator 300 for generating three moving standing light waves, an interference unit 200 for obtaining atomic beams resulting from the interaction between the cold atomic beams from the adjusters 500a and 500b and the three moving standing light waves, and monitors 400a and 400b for observing the atomic beams from the interference unit 200. In the present embodiment, the cold atomic beam generation apparatuses 100a and 100b, the adjusters 500a and 500b, the interference unit 200, and the monitors 400a and 400b are housed in a vacuum chamber (not shown). The Mach-Zehnder atomic interferometer 800 has a configuration identical to that of the inertial sensor 900 except for the monitors 400a and 400b.

Each of the cold atomic beam generation apparatuses 100a and 100b may be, for example, a device disclosed in Reference literature 1. The cold atomic beam generation apparatus 100a has the same configuration as the cold atomic beam generation apparatus 100b has. The cold atomic beam generation apparatus 100y ($y \in \{a, b\}$) comprises, in a partition 101y of the vacuum chamber thereof, an atom source 110y for generating gaseous atoms, a cold atomic beam generator 130y for generating by using a pushing laser beam 121y a cold atomic beam 131y from the cloud of the gaseous atoms trapped in the space, and an atomic beam deflector 140y for bending the course of the cold atomic beam 131y (see FIGS. 2 and 3). The cold atomic beam generator 130y has, for example, a 2D$^+$-MOT mechanism, and the atomic beam deflector 140y has, for example, a 2D-MOT mechanism. (Reference literature 1) Japanese Patent Application Laid Open No. 2020-20636

The atom source 110y generates gaseous atoms. The atom source 110y has a configuration in which a solid is sublimated or a configuration in which a liquid evaporates or volatilizes. The solid or liquid preferably made from a highly pure single element. For example, in the case of using strontium or calcium, a heating device is required, but in the case of using rubidium or cesium, the saturated steam pressure at room temperature (a temperature suitable for human activity) is high (that is, it readily vaporizes), so that sufficient gaseous atoms can be obtained without use of a heating device.

The gaseous atoms (hereinafter simply referred to as atoms) filling the partition 101y of the vacuum chamber are naturally supplied to the cold atomic beam generator 130y which is a 2D$^+$-MOT mechanism. In the 2D$^+$-MOT mechanism, as described later, the pushing laser beam 121 is used to generate the cold atomic beam 131y from the cold atom cloud trapped in the space inside coils, and furthermore, the pushing laser beam 121y leaks out in the traveling direction of the cold atomic beam 131y.

In view of the flux of the cold atomic beam 131y that can be achieved in light of the current technical level, the total number of collisions per unit time and unit volume between the atoms filling the partition 101y of the vacuum chamber and the cold atomic beam 131y is sufficiently small (i.e., the mean free path is long).

To give a simple example, the 2D$^+$-MOT mechanism includes coils (for example, Ioffe coils) for forming a two-dimensional quadrupole magnetic field, and three pairs of laser beams which are arranged in accordance with three axes of symmetry of the two-dimensional quadrupole magnetic field. In the 2D$^+$-MOT mechanism, the three pairs of laser beams apply a damping force to each atom according to the velocity of the atom (to form an optical molasses), and additionally the radiation pressure difference of each laser beam pair, which is caused by the Zeeman shift according to the position of the atom due to the two-dimensional quadrupole magnetic field and the transition selection rule in each laser beam pair, applies a damping force (for example, a force toward the zero magnetic field line of the two-dimensional quadrupole magnetic field) to each atom according to the position of the atom, resulting in generation of a cold atom cloud of atoms trapped in a space.

Each of two laser beam pairs out of the three laser beam pairs is a pair of circularly polarized light $\sigma^+$ and circularly polarized light $\sigma^-$ (where $\sigma^-$ corresponding to $\sigma^+$ is formed by reflecting $\sigma^+$ with a reflective quarter-wave plate) that travel in opposition to each other and also have the same frequency (specifically, a frequency slightly lower than the resonant frequency of the atom). The two laser beam pairs orthogonally intersect each other (specifically, the course of $\sigma^+$ for example in one of the laser beam pairs orthogonally intersects the course of $\sigma^+$ for example in the other laser beam pair), and furthermore, each of the two laser beam pairs intersects the zero magnetic field line of the two-dimensional quadrupole magnetic field formed by the coils. Each of the two laser beam pairs laser-cools, in a direction orthogonal to the zero magnetic field line, atoms existing in the space inside the 2D$^+$-MOT mechanism.

The remaining laser beam pair among the three laser beam pairs is a pair of circularly polarized light $\sigma^+$ and circularly polarized light $\sigma^-$ that travel in opposition to each other on the zero magnetic field line of the two-dimensional quadrupole magnetic field and also have the same frequency (specifically, a frequency slightly lower than the resonant frequency of the atom). The laser beam pair laser-cools, in the direction of the zero magnetic field line, atoms existing in the space inside the 2D$^+$-MOT mechanism. The beam intensity of one of the laser beams forming the laser beam pair is set stronger than the beam intensity of the other laser beam. The other laser beam is introduced into the space inside the coils using a perforated reflective plate disposed at a 45-degree angle with respect to the direction of the zero magnetic field line, and therefore the other laser light includes a "shadow (that is, dark part) in the direction of the zero magnetic field line" corresponding to the hole in the perforated reflective plate. Consequently, one of the laser beams effectively acts as the pushing laser beam 121y due to the beam intensity difference and the asymmetric scattering rates, and the cold atomic beam 131y is drawn out through the perforated reflective plate from the cold atom cloud trapped near the zero magnetic field line. As described above, one of the laser beams (effectively the pushing laser beam) leaks out together with the cold atomic beam 131y from the hole in the perforated reflective plate.

To give a simple example, the 2D-MOT mechanism has a configuration such that one laser beam pair on the zero magnetic field line of the two-dimensional quadrupole magnetic field is excluded from the 2D$^+$-MOT mechanism.

In such a cold atomic beam generation apparatus 100y, the course of the cold atomic beam 131y from the cold atomic beam generator 130y (this course matches the zero magnetic field line of the two-dimensional quadrupole magnetic field) matches the course of the pushing laser beam 121y (that is, one of the laser beams constituting one laser beam pair on the zero magnetic field line of the two-dimensional quadrupole magnetic field).

The cold atomic beam generator 130y and the atomic beam deflector 140y have a positional relationship such that the zero magnetic field line of the quadrupole magnetic field in the 2D-MOT mechanism of the atomic beam deflector 140y intersects with the course of the cold atomic beam 131y from the cold atomic beam generator 130y (that is, the zero magnetic field line of the two-dimensional quadrupole magnetic field in the 2D$^+$-MOT mechanism). The intersection angle between the direction of the zero magnetic field line of the quadrupole magnetic field in the 2D-MOT mechanism and the direction of the zero magnetic field line of the two-dimensional quadrupole magnetic field in the 2D$^+$-MOT mechanism is determined according to factors such as design conditions, but it is set to a predetermined angle that satisfies 5 degrees or more and 60 degrees or less, for example.

The cold atomic beam 131y and the leaking pushing laser beam 121y enter the atomic beam deflector 140y having a configuration that includes the 2D-MOT mechanism. From the above-described positional relationship between the cold atomic beam generator 130y and the atomic beam deflector 140y, the cold atomic beam 131y and the leaking pushing laser beam 121y obliquely cross the zero magnetic field line of the quadrupole magnetic field in the 2D-MOT mechanism of the atomic beam deflector 140y. The damping force according to the velocity and position of each atom is applied to each atom through the 2D-MOT mechanism and the traveling direction of the cold atomic beam 131 is thereby changed to the direction of the zero magnetic field line of the quadrupole magnetic field in the 2D-MOT mechanism. However, the pushing laser beam 121y is unaffected by the 2D-MOT mechanism, and therefore the traveling direction of the pushing laser beam 121y is unchanged. Consequently, the atomic beam deflector 140y causes the cold atomic beam 131y to travel in a direction different from the traveling direction of the pushing laser beam 121y.

The cold atomic beam 131y from the atomic beam deflector 140y is a cold atomic beam which has a low speed in the traveling direction of the atomic beam, a narrow speed spread in a direction perpendicular to the traveling direction of the atomic beam, and a high flux.

The cold atomic beam 131y from the atomic beam deflector 140y enters the adjuster 500y. The pushing laser beam 121y traveling in a direction different from the traveling direction of the cold atomic beam 131y is terminated appropriately and does not enter the adjuster 500y.

The adjuster 500a has the same configuration as the adjuster 500b has. M in the description related to the adjuster 500a may be the same as or different from M in the description related to the adjuster 500b. Also, $v_d$ in the description related to the adjuster 500a may be the same as or different from $v_d$ in the description related to the adjuster 500b.

The adjuster 500y (y∈{a, b}) utilizes simultaneous irradiation of laser beams to make the speeds of the atoms contained in the cold atomic beam 131y close to a predetermined speed and bend the course of the cold atomic beam 131y. The adjuster 500y comprises a laser beam generator 501y for generating M laser beams 511y. M is a predetermined integer satisfying 3≤M. The total number M of laser beams 511y is the number of laser beams 511y which are visible from atoms to be irradiated with the laser beams 511y, and does not necessarily match the number of laser light sources.

The laser beam generator 501y generates M laser beams 511y satisfying the following conditions.

(1) The course 503y of each of the M laser beams 511y intersects with an approach path 505y of the cold atomic beam 131y entering the adjuster 500y.
  (a) The component, in a direction perpendicular to the approach path 505y of the cold atomic beam 131y entering the adjuster 500y, of the sum of radiation pressure vectors that the M laser beams 511y respectively have is non-zero.
  (b) The component, in a direction to the course 505y of the cold atomic beam 131y entering the adjuster 500y, of the sum of the radiation pressure vectors that the M laser beams 511y respectively have is negative for atoms having speeds greater than a predetermined speed $v_d$, and is positive for atoms having speeds smaller than the predetermined speed $v_d$.

The condition (1) indicates that the positional relationship between the course 503y of each of the M laser beams 511y and the course 505y of the cold atomic beam 131y is neither a parallel positional relationship (where, "parallel" includes a case where both the courses match each other) nor a torsional positional relationship, and this condition is to prevent the laser beam 511y used in the adjuster 500y from adversely affecting the interference system of the interference unit 200 described later and to cause the laser beam 511y to act on the atoms contained in the cold atomic beam 131y. The course 503y and the course 505y are respectively the course of the laser beam 511y and the course of the cold atomic beam 131y immediately before they intersect with each other. The conditions (a) and (b) will be described later.

The laser beam generator 501y may further generate M laser beams 511y satisfying the following condition.

(2) The M laser beams 511y are mutually superimposed in one predetermined spatial region through which the cold atomic beam 131y passes.

The condition (2) is a condition for simultaneously inducing interactions between the atoms and the M laser beams 511y, and contributes to achievement of a compact adjuster 500y.

The conditions (a) and (b) will be described. When j represents each integer satisfying $1 \leq j \leq M$, $k_j$ represents the wave vector of a j-th laser beam 511y, and $I_j$ represents the intensity of the j-th laser beam 511y, an average radiation pressure vector $F_j$ of the j-th laser beam 511y to act on an atom moving at a velocity v is given by Formula (1). The laser beam 511y is a plane wave, h represents the Planck's constant, $\Gamma$ represents the natural width of the transition, $I_{sat}$ represents the saturation intensity of the transition, $\delta_j - k_j \cdot v$ represents detuning from a resonance frequency $f_0$ in consideration of the Doppler effect, and the speed $|v|$ is sufficiently smaller than the speed of light c.

[Formula 1]

$$F_j = \frac{1}{2} \frac{I_j/I_{sat}}{1 + I_j/I_{sat} + (\delta_j - k_j \cdot v)^2/(\Gamma/2)^2} (2\pi\Gamma)\hbar k_j \quad (1)$$

When $(I_j/I_{sat})/(1 + (\delta_j - k_j \cdot v)^2/(\Gamma^2/4))$ is small, the radiation pressure vector F which an atom receives from the M laser beams 511y is given as the sum of M average radiation pressure vectors $F_j$, so that the conditions (a) and (b) are expressed by formulas (2) and (3), respectively. The magnitude of the vector b in Formula (2) is not zero, a in Formula (3) is a positive constant, and $e_v$ represents the direction of the approach path 505y of the cold atomic beam 131y, in other words, $e_v$ is a unit direction vector in the moving direction of an atom moving at a velocity v.

[Formula 2]

$$F_{\perp v} = \sum_{j=1}^{M} (F_j)_{\perp v} = b \quad (|b| > 0) \quad (2)$$

$$F_{\parallel v} = \sum_{j=1}^{M} (F_j)_{\parallel v} = -a(|v| - v_d)e_v \quad (a > 0) \quad (3)$$

The condition (a) is a condition for bending the course of the cold atomic beam 131y in a plane containing the approach path 505y of the cold atomic beam 131y and the vector b, that is, changing the traveling direction of the cold atomic beam 131y, by irradiation of the M laser beams 511y. The condition (b) is a condition for depriving by irradiation of the M laser beams 511y momentum from an atom having a speed greater than a predetermined speed $v_d$ in the direction of the approach path 505y of the cold atomic beam 131y, and for giving momentum to an atom having a speed smaller than the predetermined speed $v_d$ in the direction of the approach path 505y of the cold atomic beam 131y.

The conditions (a) and (b) or the Formulas (2) and (3) are satisfied by appropriately setting the intensity $I_j$ of the laser beam 511y, and the detuning $\delta_j - k \cdot v$ from the resonance frequency $f_0$ in consideration of the Doppler effect, that is, the approach path 505y of the laser beams 511y and the frequency $f_j$ of the laser beam.

With a configuration satisfying at least the conditions (1), (a), and (b), when the speed of an atom in the direction of the approach path 505y of the cold atomic beam 131y is greater than a predetermined speed, the atom is decelerated in the direction of the approach path 505y of the cold atomic beam 131y, and when the speed of an atom in the direction of the approach path 505y of the cold atomic beam 131y is smaller than the predetermined speed, the atom is accelerated in the direction of the approach path 505y of the cold atomic beam 131y, and the atom in the cold atomic beam 131y receives a force in the direction to the vector b. Because atoms in the cold atomic beam 131y receive a force in the direction of the vector b, the direction of an exit path 507y of the cold atomic beam 131y from the adjuster 500y is different from the direction of the approach path 505y of the cold atomic beam 131y. Therefore, the speeds of atoms in the course of the cold atomic beam 131y approach a predetermined speed, and the course of the cold atomic beam 131a is bent.

An example of the configuration satisfying the above conditions (1), (a), and (b) will be described. Assuming that the speed $|v|$ is sufficiently smaller than the speed of light c, that is, Formula (4) is assumed for each j and further higher-order terms of a minute amount $\varepsilon$ are ignored, a first-order approximation of Formula (1) is given by Formula (5).

[Formula 3]

$$\varepsilon = \frac{|2\delta_j k_j \cdot v|}{\delta_j^2 + (1 + I_j/I_{sat})(\Gamma/2)^2} \ll 1 \quad (4)$$

$$F_j \simeq \frac{1}{2} \frac{I_j/I_{sat}}{1 + I_j/I_{sat} + \delta_j^2/(\Gamma/2)^2}(2\pi\Gamma)\hbar k_j + \quad (5)$$

$$\frac{1}{2} \frac{2I_j/I_{sat}}{(\Gamma/2)^2(1 + I_j/I_{sat} + \delta_j^2/(\Gamma/2)^2)^2}(2\pi\Gamma)\hbar\delta_j(k_j \cdot v)k_j$$

Therefore, in the case of $\delta_j = \delta$ and $I_j = I$ for any j, Formula (6) holds.

[Formula 4]

$$\sum_{j=1}^{M}(F_j) \simeq \frac{1}{2} \frac{I/I_{sat}}{1 + I/I_{sat} + \delta^2/(\Gamma/2)^2}(2\pi\Gamma)\hbar \quad (6)$$

$$\sum_{j=1}^{M} k_j \frac{1}{2} \frac{2I/I_{sat}}{(\Gamma/2)^2(1 + I/I_{sat} + \delta^2/(\Gamma/2)^2)^2}(2\pi\Gamma)\hbar\delta\sum_{j=1}^{M}(k_j \cdot v)k_j$$

Here, when the condition of Formula (7) is satisfied, Formulas (8) and (9) hold with respect to Formula (6). Here, $e_j$ is a unit direction vector in a direction perpendicular to the unit direction vector $e_v$ on a plane containing the unit direction vector $e_v$ and the wave vector $k_j$.

[Formula 5]

$$\sum_{j=1}^{M} k_j = 0 \tag{7}$$

$$\sum_{j=1}^{M} (F_j)_{\perp v} \simeq \frac{1}{2} \frac{2I/I_{sat}}{(\Gamma/2)^2 \left(1 + I/I_{sat} + \delta^2/(\Gamma/2)^2\right)^2} (2\pi\Gamma)\hbar\delta \sum_{j=1}^{M} (k_j \cdot v)(k_j \cdot e_j) e_j \tag{8}$$

$$\sum_{j=1}^{M} (F_j)_{\|v} = \frac{1}{2} \frac{2I/I_{sat}}{(\Gamma/2)^2 \left(1 + I/I_{sat} + \delta^2/(\Gamma/2)^2\right)^2} (2\pi\Gamma)\hbar\delta \sum_{j=1}^{M} (k_j \cdot e_v)^2 |v| e_v \tag{9}$$

As an example, when M=4N (where N represents a predetermined integer satisfying 1≤N), the wave vectors $k_{4n-3}$, $k_{4n-2}$, $k_{4n-1}$ and $k_{4n}$ are defined by Formulas (10), (11), (12) and (13) respectively where n∈{1, ..., N}, and $e_{n1}$ and $e_{n2}$ are arbitrary unit direction vectors in directions each perpendicular to the unit direction vector $e_v$. Here, $\alpha_n$, $\beta_n$, $\gamma_n$, $\eta_n$ are constants which each depend on n and are greater than zero (that is, $\alpha_n>0$, $\beta_n>0$, $\gamma_n>0$, $\eta_n>0$).

Furthermore, $\alpha_n \neq \eta$. The condition (1) is satisfied by $\beta_n \neq 0$ and $\gamma_n \neq 0$.

[Formula 6]

$$k_{4n-3} = \frac{(\alpha_n + \eta_n)e_v + \beta_n e_{n,1}}{2} \tag{10}$$

$$k_{4n-2} = \frac{(\alpha_n + \eta_n)e_v + \beta_n e_{n,1}}{2} \tag{11}$$

$$k_{4n-1} = \frac{-(\alpha_n + \eta_n)e_v + \gamma_n e_{n,2}}{2} \tag{12}$$

$$k_{4n} = \frac{-(\alpha_n + \eta_n)e_v + \gamma_n e_{n,2}}{2} \tag{13}$$

For the wave vectors $k_{4n-3}$, $k_{4n-2}$, $k_{4n-1}$, and $k_{4n}$ defined by Formulas (10), (11), (12) and (13) respectively, Formulas (14), (15) and (16) hold. Therefore, Formulas (7) and (2) hold, that is, the condition (a) is satisfied.

[Formula 7]

$$\sum_{j=1}^{M} k_j = \sum_{n=1}^{N} (k_{4n-3} + k_{4n-2} + k_{4n-1} + k_{4n}) = 0 \tag{14}$$

$$\sum_{j=1}^{M} (k_j \cdot v)(k_j \cdot e_j)e_j = \tag{15}$$

$$\sum_{n=1}^{N} \{(k_{4n-3} \cdot v)(k_{4n-3} \cdot e_{n,1})e_{n,1} + (k_{4n-2} \cdot v)(k_{4n-2} \cdot e_{n,1})e_{n,1} + (k_{4n-1} \cdot v)$$

$$(k_{4n-1} \cdot e_{n,2})e_{n,2} + (k_{4n} \cdot v)(k_{4n} \cdot e_{n,2})e_{n,2}\} = \sum_{n=1}^{N} \{2\eta_n(\beta_n e_{n,1} + \gamma_n e_{n,2})\}$$

$$\sum_{j=1}^{M} (k_j \cdot e_v)^2 |v| e_v = \sum_{n=1}^{N} (\alpha_n^2 + \eta_n^2)|v|e_v \tag{16}$$

By replacing, by $(|v|-v_d)e_v$, $v$ on the right side of Formula (9) in consideration of $\alpha_n \neq 0$, $\eta_n \neq 0$ and Formula (16) with attention to Formula (3) under the condition of $\delta<0$, the left side of Formula (6) can be written as Formula (17).

[Formula 8]

$$\sum_{j=1}^{M} F_j = \tag{17}$$

$$\sum_{n=1}^{N} \left\{ \frac{1}{2} \frac{I/I_{sat}}{1 + I/I_{sat} + (\delta - k_{4n-3} \cdot (|v| - v_d)e_v)^2/(\Gamma/2)^2} (2\pi\Gamma)\hbar k_{4n-3} + \right.$$

$$\frac{1}{2} \frac{I/I_{sat}}{1 + I/I_{sat} + (\delta - k_{4n-2} \cdot (|v| - v_d)e_v)^2/(\Gamma/2)^2} (2\pi\Gamma)\hbar k_{4n-2} +$$

$$\frac{1}{2} \frac{I/I_{sat}}{1 + I/I_{sat} + (\delta - k_{4n-1} \cdot (|v| - v_d)e_v)^2/(\Gamma/2)^2} (2\pi\Gamma)\hbar k_{4n-1} +$$

$$\left. \frac{1}{2} \frac{I/I_{sat}}{1 + I/I_{sat} + (\delta - k_{4n} \cdot (|v| - v_d)e_v)^2/(\Gamma/2)^2} (2\pi\Gamma)\hbar k_{4n} \right\}$$

Therefore, a configuration satisfying the condition (b) is obtained by setting frequencies $f_{4n-3}$, $f_{4n-2}$, $f_{4n-1}$, and $f_{4n}$ to satisfy Formulas (18), (19), (20), and (21) respectively, where the frequency $f_j$ represents the frequency of the laser beam 511y of the wave vector $k_j$. Here, the intensities of the laser beams 511y are equal to each other, and $\delta<0$. The wave vectors $k_{4n-3}$, $k_{4n-2}$, $k_{4n-1}$, and $k_{4n}$ in Formulas (18), (19), (20), and (21) satisfy Formulas (10), (11), (12), and (13), respectively.

[Formula 9]

$$f_{4n-3} = f_0 + \delta + v_d k_{4n-3} \cdot e_v \tag{18}$$

$$f_{4n-2} = f_0 + \delta + v_d k_{4n-2} \cdot e_v \tag{19}$$

$$f_{4n-1} = f_0 + \delta + v_d k_{4n-1} \cdot e_v \tag{20}$$

$$f_{4n} = f_0 + \delta + v_d k_{4n} \cdot e_v \tag{21}$$

When the angle between the approach path 505y of the cold atomic beam 131y, which is the moving direction $e_v$ of the atoms, and the wave vector $k_j$ is represented by $\theta_j$, $|\theta_j| \neq \pi/2$ and $|\theta_j| \neq 0$ from $\alpha_n + \eta_n \neq 0$, $\alpha_n - \eta_n \neq 0$, $\beta_n \neq 0$, and $\gamma_n \neq 0$. Here, the sign of the angle is positive for counter-clockwise rotation, and negative for clockwise rotation. Considering the contribution of the radiation pressure of the j-th laser beam 511y to the adjustment of the speeds of atoms, it is preferable that $\theta_j$ satisfies $\cos(\pi/4) \leq |\cos\theta_j| < 1$. Further, considering easiness of mounting, it is preferable that $\theta_j$ satisfies $\cos(\pi/4) \leq |\cos\theta_j| \leq \cos(\pi/10)$. When the traveling direction of the cold atomic beam 131y is finely adjusted, $\eta_n$ is set to a minute value.

The dispersion relation of the laser beam in vacuum is represented by $|k_j| = f_j/c$. Therefore, the frequencies $f_{4n-3}$, $f_{4n-2}$, $f_{4n-1}$, and $f_{4n}$ may be determined by Formulas (22), (23), (24) and (25) respectively.

[Formula 10]

$$f_{4n-3} = \frac{f_0 + \delta}{1 - \frac{v_d}{c}\cos\theta_{4n-3}} \tag{22}$$

$$f_{4n-2} = \frac{f_0 + \delta}{1 - \frac{v_d}{c}\cos\theta_{4n-2}} \tag{23}$$

-continued $$f_{4n-1} = \frac{f_0 + \delta}{1 - \frac{v_d}{c}\cos\theta_{4n-1}} \quad (24)$$

$$f_{4n} = \frac{f_0 + \delta}{1 - \frac{v_d}{c}\cos\theta_{4n}} \quad (25)$$

From a physical review of Formula (14), the four laser beams 511y (that is, (4n-3)-th laser beam, (4n-2)-th laser beam, (4n-1)-th laser beam, 4n-th laser beam) are mutually superimposed in one predetermined spatial region $S_n$ through which the cold atomic beam 131y passes. Therefore, according to this configuration example, the condition (2) is also satisfied for each n.

Figure 4:
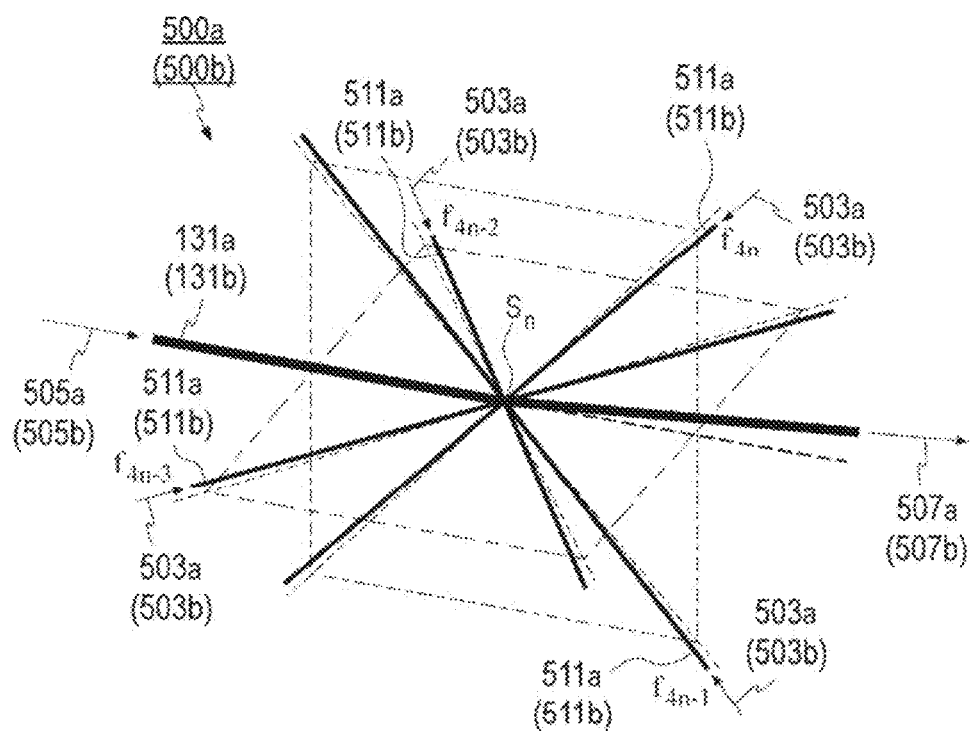
FIG. 4 is a configuration example of the adjuster.
Figure 5:
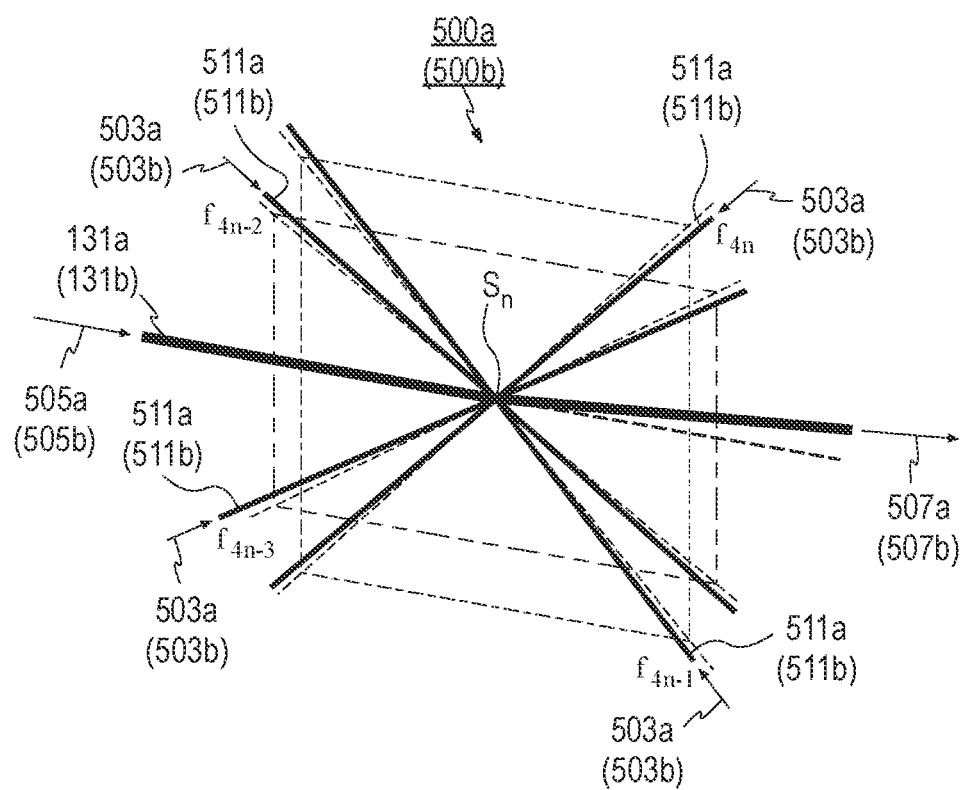
FIG. 5 is a configuration example of the adjuster.
Figure 6:
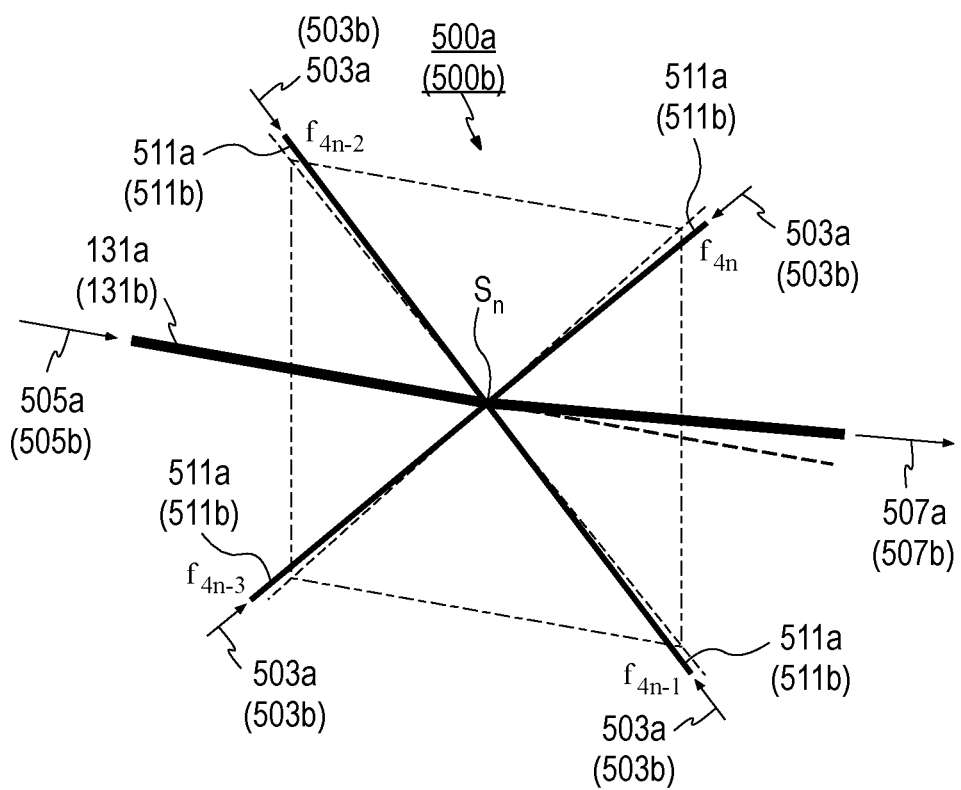
FIG. 6 is a configuration example of the adjuster.

As a specific example, a configuration example in the case of M=4 is shown in FIG. 4. In particular, a configuration example in the case of $e_{n1}=e_{n2}$ is shown in FIG. 5. Particularly, a configuration example in the case of $e_{n1}=e_{n2}$ and $\beta_n=\gamma_n$ is shown in FIG. 6.

Another example will be described. The wave vectors $k_{3n-2}$, $k_{3n-1}$, and $k_{3n}$ are defined by Formulas (26), (27) and (28) respectively, where M=3N (where N represents a predetermined integer satisfying $1 \leq N$), $n \in \{1, \ldots, N\}$, and $e_n$ is an arbitrary unit direction vector in a direction perpendicular to the unit direction vector $e_v$. Here, $\alpha_n$, $\beta_n$, and $\eta_n$ are constants which each depend on n and are greater than zero (that is, $\alpha_n > 0$, $\beta_n > 0$, $\eta_n > 0$). Here, $\alpha_n \neq \eta_n$. The condition (1) is satisfied by $\beta_n \neq 0$.

[Formula 11]

$$k_{3n-2} = -2\eta_n e_v - 2\beta_n e_n \quad (26)$$

$$k_{3n-1} = (\alpha_n + \eta_n)e_v + \beta_n e_n \quad (27)$$

$$k_{3n} = -(\alpha_n - \eta_n)e_v + \beta_n e_n \quad (28)$$

Since the Formulas (29), (30) and (31) hold for the wave vectors $k_{3n-2}$, $k_{3n-1}$ and $k_{3n}$ defined by the Formulas (26), (27) and (28) respectively, the Formulas (7) and (2) holds. That is, condition (a) is satisfied.

[Formula 12]

$$\sum_{j=1}^{M} k_j = \sum_{n=1}^{N} (k_{3n-2} + k_{3n-1} + k_{3n}) = 0 \quad (29)$$

$$\sum_{j=1}^{M} (k_j \cdot v)(k_j \cdot e_j)e_j = \quad (30)$$

$$\sum_{n=1}^{N} \{(k_{3n-2} \cdot v)(k_{3n-2} \cdot e_n)e_n + (k_{3n-1} \cdot v)(k_{3n-1} \cdot e_n)e_n + (k_3 \cdot v)(k_3 \cdot e_n)e_n = \sum_{n=1}^{N} 6\eta_n \beta_n e_n$$

$$\sum_{j=1}^{M} (k_j \cdot e_v)^2 |v|e_v = \sum_{n=1}^{N} (2\alpha_n^2 + 6\eta_n^2)|v|e_v \quad (31)$$

Furthermore, with attention to Formula (3) under the condition of $\delta < 0$ as in the case of M=4N, the left side of Formula (6) can be written as Formula (32).

[Formula 13]

$$\sum_{j=1}^{M} F_j = \sum_{n=1}^{N} \left\{ \frac{1}{2} \frac{I/I_{sat}}{1 + I/I_{sat} + (\delta - k_{3n-2} \cdot (|v| - v_d)e_v)^2/(\Gamma/2)^2} (2\pi\Gamma)\hbar k_{3n-2} + \frac{1}{2} \frac{I/I_{sat}}{1 + I/I_{sat} + (\delta - k_{3n-1} \cdot (|v| - v_d)e_v)^2/(\Gamma/2)^2} (2\pi\Gamma)\hbar k_{3n-1} + \frac{1}{2} \frac{I/I_{sat}}{1 + I/I_{sat} + (\delta - k_{3n} \cdot (|v| - v_d)e_v)^2/(\Gamma/2)^2} (2\pi\Gamma)\hbar k_{3n} \right\}$$

Therefore, a configuration satisfying the condition (b) is obtained by setting frequencies $f_{3n-2}$, $f_{3n-1}$, and $f_{3n}$ to satisfy Formulas (33), (34), and (35) respectively, where the frequency $f_j$ represents the frequency of the laser beam 511y of the wave vector $k_j$. Here, the intensities of the laser beams 511y are equal to each other, and $\delta < 0$. The wave vectors $k_{3n-2}$, $k_{3n-1}$, $k_{3n}$ of Formulas (33), (34) and (35) satisfy Formulas (26), (27) and (28), respectively.

[Formula 14]

$$f_{3n-2} = f_0 + \delta + v_d k_{3n-2} \cdot e_v \quad (33)$$

$$f_{3n-1} = f_0 + \delta + v_d k_{3n-1} \cdot e_v \quad (34)$$

$$f_{3n} = f_0 + \delta + v_d k_{3n} \cdot e_v \quad (35)$$

When the angle between the approach path 505y of the cold atomic beam 131y, which is the moving direction $e_v$ of the atoms, and the wave vector $k_j$ is represented by $\theta_j$, $|\theta_j| \neq \pi/2$ and $|\theta_j| \neq \theta$ hold from $\alpha_n + \eta_n \neq 0$, $\alpha_n - \eta_n \neq 0$, $\beta_n \neq 0$, and $\eta_n \neq 0$. Considering the contribution of the radiation pressure of the j-th laser beam 511y to the adjustment of the speeds of atoms, it is preferable that $\theta_j$ satisfies $\cos(\pi/4) \leq |\cos\theta_j| < 1$, and in consideration of easiness of mounting, it is further preferable that $\theta_j$ satisfies $\cos(\pi/4) \leq |\cos\theta_j| \leq \cos(\pi/10)$. When the traveling direction of the cold atomic beam 131y is finely adjusted, $\eta_n$ is set to a minute value.

The dispersion relation of the laser beam in vacuum is represented by $|k_j| = f_j/c$. Therefore, the frequencies $f_{3n-2}$, $f_{3n-1}$, and $f_{3n}$ may be determined according to Formulas (36), (37) and (38) respectively.

[Formula 15]

$$f_{3n-2} = \frac{f_0 + \delta}{1 - \frac{v_d}{c}\cos\theta_{3n-2}} \quad (36)$$

$$f_{3n-1} = \frac{f_0 + \delta}{1 - \frac{v_d}{c}\cos\theta_{3n-1}} \quad (37)$$

$$f_{3n} = \frac{f_0 + \delta}{1 - \frac{v_d}{c}\cos\theta_{3n}} \quad (38)$$

As in the case of M=4N, the three laser beams 511y (that is, (3n-2)-th laser beam, (3n-1)-th laser beam, and 3n-th laser beam) are mutually superimposed in one predetermined special region $S_n$ through which the cold atomic beam 131y passes, so that the condition (2) is also satisfied for each n in this configuration example.

Figure 7:
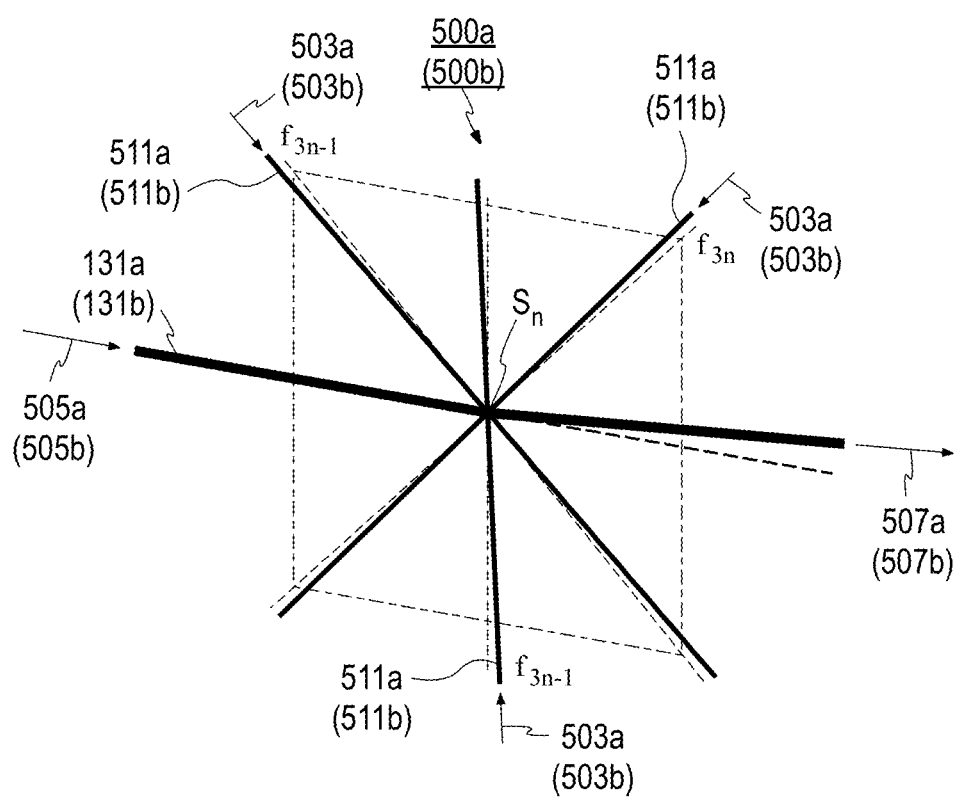
FIG. 7 is a configuration example of the adjuster.

As a specific example, a configuration example in the case of M=3 is shown in FIG. 7.

In each of the configurations shown in FIGS. 5 and 6, the spatial region $S_n$ may be subjected to laser cooling in a direction that is perpendicular to the unit direction vector $e_v$ and perpendicular to the unit direction vector $e_{n1}$ ($e_{n2}$). In the configuration of FIG. 7, the spatial region $S_n$ may be subjected to laser cooling in a direction that is perpendicular to the unit direction vector $e_v$ and perpendicular to the unit direction vector $e_n$.

In the above configuration example, N>1 may be satisfied. However, N=1 is sufficient for the case of changing the traveling directions of the cold atomic beams 131$a$ and 131$b$ for the sake of making the two counter-propagating cold atomic beams 131$a$ and 131$b$ travel in direct opposition to each other.

For example, with respect to a rubidium atom, the resonance frequency $f_0$ of the $D_2$ line ($5S_{1/2} \to 5P_{3/2}$ transition) is 384.23 THz and the natural width F of the transition is about 6 MHz, so that the adjuster 500$y$ can adopt a configuration satisfying the above conditions (1), (2), (a) and (b) when $\delta = -\Gamma/2$, $v_d = 20$ [m/s] in the case that the mode of the atomic speed distribution in the direction of the approach path 505$y$ of the cold atomic beam 131$y$ from the atomic beam deflector 140$y$ is 20 m/s, $\theta_{4n-3} = \pi/4 - \Delta$, $\theta_{4n-2} = -\pi/4 - \Delta$, $\theta_{4n-1} = -3\pi/4 - \Delta$, $\theta_{4n} = -3\pi/4 - \Delta$ (here, $\Delta$ represents a minute angle), and M=4.

As is clear from the present embodiment, the feature of the adjuster 500$y$ is not in a hardware configuration of the laser beam generator 501$y$, but is rather recognized as various conditions that the M laser beams 511$y$ have to satisfy. In addition, existing laser beam generation techniques can be adopted as a technique for generating the laser beam 511$y$. Thus, detailed description of the hardware configuration of the laser beam generator 501$y$ is omitted. When the laser beam generator 501$y$ generates a moving standing light wave as in the case of the configuration example described above, in imitation of the optical configuration of the moving standing light wave generator 300 described later, the hardware configuration of the laser beam generator 501$y$ is implemented, for example, by a combination of a laser light source, an optical fiber, an AOM (acousto-optic modulator), a beam shaper, and the like.

Individual atoms contained in cold atomic beam 131$y$ from the adjuster 500$y$ are set to be at the same energy level by optical pumping as needed. A cold atomic beam 131$y$ containing atoms at the same energy level enters the interference unit 200.

In the interference unit 200, each of the cold atomic beam 131$a$ from the adjuster 500$a$ and the cold atomic beam 131$b$ from the adjuster 500$b$ passes through three moving standing light waves 200$a$, 200$b$, and 200$c$. A first moving standing light wave 200$a$ and a third moving standing light wave 200$c$ out of the three moving standing light waves 200$a$, 200$b$, and 200$c$ have a property called $\pi/2$ pulse described later, and the second moving standing light wave 200$b$ has a property called $\pi$ pulse described later. Each moving standing light wave is generated by two counter-propagating laser beams having different frequencies. The moving standing light wave drifts at a speed which is much smaller than the speed c of light. However, the difference between the wave number of one laser beam and the wave number of the other laser beam is sufficiently small.

Figure 8:
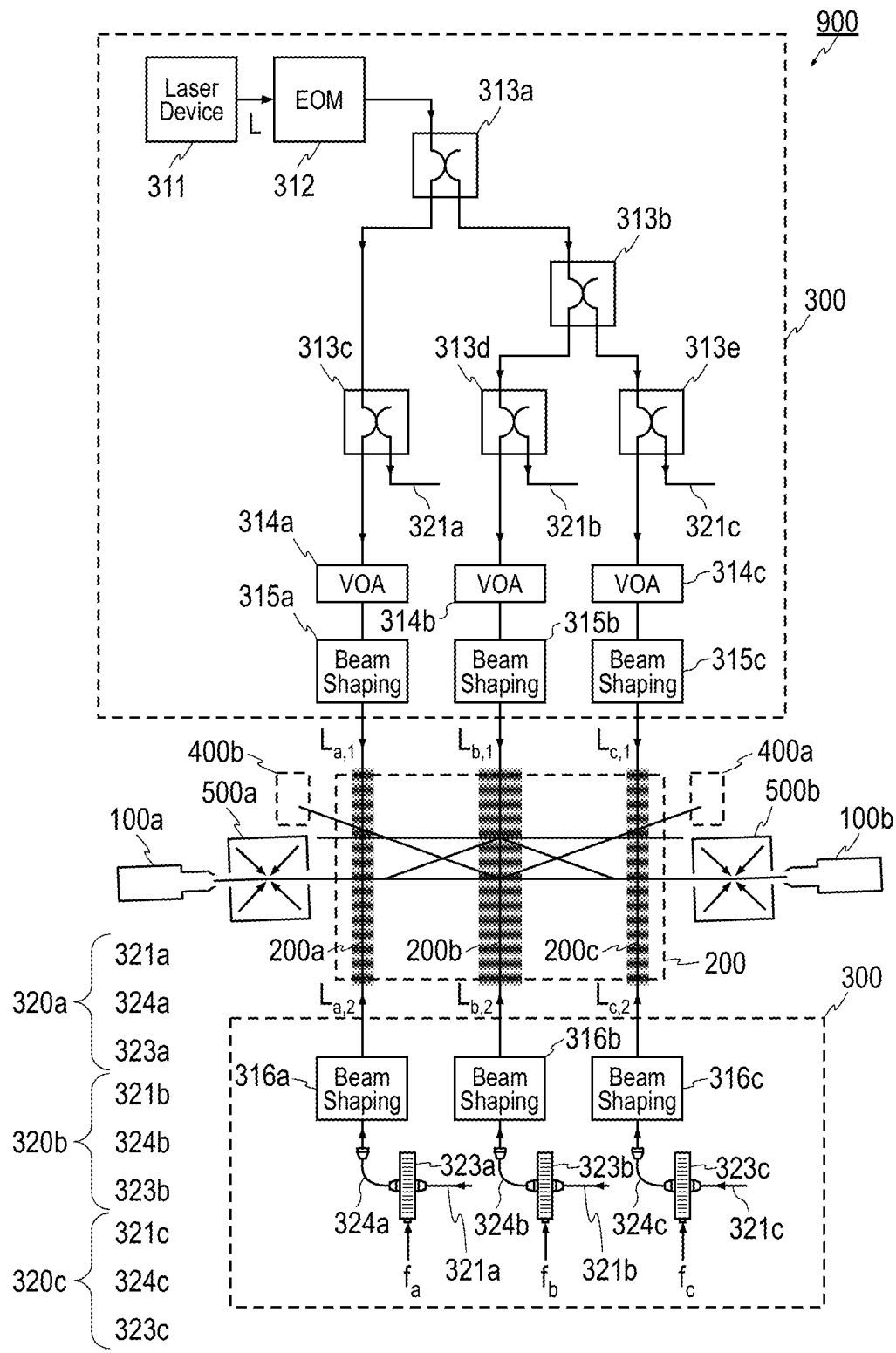
FIG. 8 is an optical configuration example of an interference unit.

Here, an example of an optical configuration (see FIG. 8) of the moving standing light wave generator 300 for generating the three moving standing light waves 200$a$, 200$b$, and 200$c$ will be described.

The moving standing light wave generator 300 includes three optical modulation devices 320$a$, 320$b$ and 320$c$ corresponding to the three moving standing light waves 200$a$, 200$b$ and 200$c$. The optical modulation device 320$x$ ($x \in \{a,b,c\}$) includes optical fibers 321$x$ and 324$x$ through which a laser beam propagates, and a frequency shifter 323$x$ that is connected to the optical fibers 321$x$ and 324$x$ and shifts the frequency of the laser beam. The frequency shifter 323$x$ is, but is not limited to, is an AOM or an EOM (electro-optic modulator), for example.

A laser beam L from a laser light source 311 passes through EOM 312 to be shifted in frequency by a predetermined frequency. The frequency-shifted laser beam L is equally divided by an optical fiber coupler 313$a$. One of the two laser beams L coming out of the optical fiber coupler 313$a$ is equally divided by an optical fiber coupler 313$c$, and the other of the two laser beams L coming out of the optical fiber coupler 313$a$ is equally divided by an optical fiber coupler 313$b$. One of the two laser beams L coming out of the optical fiber coupler 313$b$ is equally divided by an optical fiber coupler 313$d$, and the other of the two laser beams L coming out of the optical fiber coupler 313$b$ is equally divided by an optical fiber coupler 313$e$.

One of the two laser beams L coming out of the optical fiber coupler 313$c$ is attenuated by a VOA (Variable Optical Attenuator) 314$a$, and then subjected to shaping so as to be a desired beam (for example, a Gaussian beam) by a beam shaper 315$a$ including, for example, a lens, a collimator, and so on. The thus-obtained beam $L_{a,1}$ enters the interference unit 200. The other of the two laser beams L coming out of the optical fiber coupler 313$c$ is guided to an AOM 323$a$ without crossing the atomic beam by an optical fiber 321$a$ with one end thereof connected to the optical fiber coupler 313$c$ by an unillustrated optical connector. An intermediate part of the optical fiber 321$a$ is not depicted in FIG. 8 to make the drawing easily visible.

One of the two laser beams L coming out of the optical fiber coupler 313$d$ is attenuated by a VOA 314$b$, and then subjected to shaping so as to be a desired beam (for example, a Gaussian beam) by a beam shaper 315$b$ including, for example, a lens, a collimator, and so on. The thus-obtained beam $L_{b,1}$ enters the interference unit 200. The other of the two laser beams L coming out of the optical fiber coupler 313$d$ is guided to an AOM 323$b$ without crossing the atomic beam by an optical fiber 321$b$ with one end thereof connected to the optical fiber coupler 313$d$ by an unillustrated optical connector. An intermediate part of the optical fiber 321$b$ is not depicted in FIG. 8 to make the drawing easily visible.

One of the two laser beams L coming out of the optical fiber coupler 313$e$ is attenuated by a VOA 314$c$, and then subjected to shaping so as to be a desired beam (for example, a Gaussian beam) by a beam shaper 315$c$ including, for example, a lens, a collimator, and so on. The thus-obtained beam $L_{c,1}$ enters the interference unit 200. The other of the two laser beams L coming out of the optical fiber coupler 313$e$ is guided to an AOM 323$c$ without crossing the atomic beam by an optical fiber 321$c$ with one end thereof connected to the optical fiber coupler 313$e$ by an unillustrated optical connector. An intermediate part of the optical fiber 321$c$ is not depicted in FIG. 8 to make the drawing easily visible.

The other end of the optical fiber 321$x$ ($x \in \{a, b, c\}$) is connected to the frequency shifter 323$x$ by an optical connector, and thus the laser beam L enters the frequency shifter 323$x$. The frequency of laser beam L is shifted by the frequency shifter 323$x$. The amount of shift depends on the frequency $f_x$ of a signal input to the frequency shifter 323$x$. As a result, the laser beam L is phase-modulated. One end of the optical fiber 324$x$ is connected to the frequency shifter 323$x$ by an optical connector, and thus the laser beam L coming out of the frequency shifter 323$x$ enters the optical fiber 324$x$. The laser beam L comes out of an optical connector attached to the other end of the optical fiber 324*x*, and is subjected to shaping so as to be a desired beam (for example, a Gaussian beam) by a beam shaper 316*x* including, for example, a lens, a collimator, and so on. The thus-obtained beam $L_{x,2}$ enters interference unit 200.

As a result, the laser beam $L_{x,1}$ that has not passed through the optical modulation device 320*x* and the laser beam $L_{x,2}$ that has passed through the optical modulation device 320*x* counter-propagate in a free space to generate a moving standing light wave 200*x* ($x \in \{a,b,c\}$).

The atomic interference system in the interference unit 200 uses transition between two levels of an atom caused by light irradiation. Therefore, from the viewpoint of avoiding decoherence caused by spontaneous emission, long-lived transition between two levels is generally used. For example, when the atomic beam is an alkali-metal atomic beam, the atomic interference system uses induced Raman transition between two levels included in a hyperfine structure in a ground state. Let |g> be the lowest energy level and |e> be an energy level higher than |g>, in the hyperfine structure. In general, the induced Raman transition between two levels is achieved by a moving standing light wave that is formed by counter irradiation of two laser beams, whose difference frequency is nearly equal to the resonance frequency of |g> and |e>.

The atomic interference using a two-photon Raman process caused by moving standing light waves will be described below. The interaction between the cold atomic beam 131*a* from the adjuster 500*a* and three moving standing light waves will be described. However, except for a case where the cold atomic beam 131*b* is referred to, description on the interaction between the cold atomic beam 131*b* from the adjuster 500*b* and the three moving standing light waves can be obtained by merely changing "cold atomic beam 131*a*" to "cold atomic beam 131*b*", changing "first moving standing light wave 200*a*" to "third moving standing light wave 200*c*", changing "third moving standing light wave 200*c*" to "first moving standing light wave 200*a*", and changing "cold atomic beam 131*c*" to "cold atomic beam 131*d*" in the following description.

In the course of the cold atomic beam 131*a* passing through the first moving standing light wave 200*a*, the state of every atom changes from an initial state |g, p> to a superposition state of |g, p> and |e, p+h($k_1$-$k_2$)>. Note that p represents momentum of an atom, $k_1$ represents a wave number of one of the two laser beams that form the moving standing light wave, and $k_2$ represents a wave number of the other laser beam ($p_0$=p, $p_1$=p+h($k_1$-$k_2$) in FIGS. 2 and 3). For example, by appropriately setting a time Δt required to pass through the first moving standing light wave 200*a* (that is, a time of interaction between an atom and the moving standing light wave), the ratio between the existence probability of |g, p> and the existence probability of |e, p+h($k_1$-$k_2$)> immediately after the passage through the first moving standing light wave 200*a* is 1:1. An atom acquires momentum of two photons while transiting from |g, p> to |e, p+h($k_1$-$k_2$)> through absorption and emission of the two photons traveling against each other. Therefore, the moving direction of atoms in the state |e, p+h($k_1$-$k_2$)> deviates from the moving direction of atoms in the state |g, p>. In other words, in the course of the cold atomic beam 131*a* passing through the first moving standing light wave 200*a*, the cold atomic beam 131*a* splits into, at a ratio of 1:1, an atomic beam composed of atoms in the state |g, p> and an atomic beam composed of atoms in the state |e, p+h($k_1$-$k_2$)>. The first moving standing light wave 200*a* is called π/2 pulse, has a function as a splitter for the cold atomic beam 131*a*, and has a function as a combiner described later for the cold atomic beam 131*b*.

After the split, the atomic beam composed of atoms in the state |g, p> and the atomic beam composed of atoms in the state |e, p+h($k_1$-$k_2$)> pass through the second moving standing light wave 200*b*. For example, by setting a time required to pass through the second moving standing light wave 200*b* at 2Δt, in other words, by setting a time of interaction between an atom and the moving standing light wave at 2Δt, the atomic beam composed of atoms in the state |g, p> is reversed to an atomic beam composed of atoms in the state |e, p+h($k_1$-$k_2$)> in the course of passing through the second moving standing light wave 200*b*, and the atomic beam composed of atoms in the state |e, p+h($k_1$-$k_2$)> is reversed to an atomic beam composed of atoms in the state |g, p> in the course of passing through the second moving standing light wave 200*b*. At this time, as for the former, the moving direction of the atoms that have transited from |g, p> to |e, p+h($k_1$-$k_2$)> deviates from the moving direction of the atoms in the state |g, p>, as described above. As a result, the traveling direction of the atomic beam composed of atoms in the state |e, p+h($k_1$-$k_2$)> after the passage through the second moving standing light wave 200*b* becomes parallel to the traveling direction of the atomic beam composed of atoms in the state |e, p+h($k_1$-$k_2$)> after the passage through the first moving standing light wave 200*a*. Moreover, as for the latter, an atom loses the same momentum as the momentum gained from two photons in transition from |e, p+h($k_1$-$k_2$)> to |g, p> through absorption and emission of the two photons traveling against each other. That is, the moving direction of atoms after transition from |e, p+h($k_1$-$k_2$)> to |g, p> deviates from the moving direction of atoms in the state |e, p+h($k_1$-$k_2$)> before the transition. As a result, the traveling direction of the atomic beam composed of atoms in the state |g, p> after the passage through the second moving standing light wave 200*b* becomes parallel to the traveling direction of the atomic beam composed of atoms in the state |g, p> after the passage through the first moving standing light wave 200*a*. The second moving standing light wave 200*b* is called π pulse, and has a function as a mirror for the atomic beams.

After the reversal, the atomic beam composed of atoms in the state |g, p> and the atomic beam composed of atoms in the state |e, p+h($k_1$-$k_2$)> pass through the third moving standing light wave 200*c*. Assume that the cold atomic beam 131*a* passes through the first moving standing light wave 200*a* at time $t_1$=T and the two atomic beams after the split pass through the second moving standing light wave 200*b* at time $t_2$=T+ΔT. Then, two atomic beams after the reversal pass through the third moving standing light wave 200*c* at time $t_3$=T+2ΔT. At the time $t_3$, the atomic beam composed of atoms in the state |g, p> after the reversal and the atomic beam composed of atoms in the state |e, p+h($k_1$-$k_2$)> after the reversal cross each other. For example, by appropriately setting a time required to pass through the third moving standing light wave 200*c*, that is, a time of interaction between an atom and the moving standing light wave, specifically, by setting a time required to pass through the third moving standing light wave 200*c* at Δt mentioned above, it is possible to obtain a cold atomic beam 131*c* corresponding to a superposition state of |g, p> and |e, p+h($k_1$-$k_2$)> of individual atoms contained in a region of intersection between the atomic beam composed of atoms in the state |g, p> and the atomic beam composed of atoms in the state |e, p+h($k_1$-$k_2$)>. This cold atomic beam 131*c* is an output of the interference unit 200. The third moving standing light wave 200c is called π/2 pulse, has a function as a combiner for the cold atomic beam 131a, and has a function as the above-described splitter for the cold atomic beam 131b.

Next, the monitors 400a and 400b will be described. Since the monitor 400a and the monitor 400b have the same configuration, only the monitor 400a will be described. The description on the monitor 400b will be obtained by merely changing "cold atomic beam 131c" to "cold atomic beam 131d", changing "probe light 408a" to "probe light 408b", changing "photodetector 409a" to "photodetector 409b", and changing "third moving standing light wave 200c" to "first moving standing light wave 200a" in the following description on the monitor 400a. The monitor 400a irradiates the cold atomic beam 131c from the interference unit 200 with probe light 408a, and detects fluorescence from the atoms in the state $|e, p+h(k_1-k_2)\rangle$ using a photodetector 409a. Examples of the photodetector 409a include a photomultiplier tube and a fluorescence photodetector. Alternatively, in the case of using a channeltron as the photodetector 409a, the atomic beam of one of the two paths after the passage through the third moving standing light wave 200c may be ionized by a laser beam or the like in place of the probe light, and ions may be detected with the channeltron.

In the case that the Mach-Zehnder atomic interferometer 800 is applied to an atomic gyroscope that is the inertial sensor 900, the monitors 400a and 400b may perform processing for detecting an angular velocity and an acceleration as physical quantities from the population of atoms in an excited state. While an angular velocity and an acceleration in a plane containing two paths of the atomic beams from the irradiation of the first moving standing light wave 200a to the irradiation of the third moving standing light wave 200c are applied to the Mach-Zehnder atomic interferometer 800, a phase difference is produced in the two paths of the atomic beams from the irradiation of the first moving standing light wave 200a to the irradiation of the third moving standing light wave 200c. This phase difference is reflected in the existence probabilities of the state $|g\rangle$ and the state $|e\rangle$ of the individual atoms (these atoms are contained in the cold atomic beam 131c) after the passage through the third moving standing light wave 200c, and further also reflected in the existence probabilities of the state $|g\rangle$ and the state $|e\rangle$ of the individual atoms (these atoms are contained in the cold atomic beam 131d) after the passage through the first moving standing light wave 200a. Therefore, the monitors 400a and 400b observe the cold atomic beams 131c and 131d from the interference unit 200 respectively, that is, measure the populations of atoms, for example, in the excited state $|e\rangle$, whereby it is possible to detect the angular velocity and the acceleration from these populations. In a configuration of irradiating two counter-propagating atomic beams with moving standing light waves, the processing for detecting the angular velocity and the acceleration from the populations of atoms in an excited state is well known, and thus description thereof is omitted (for example, see the above-described Non-patent literature 2).

Modifications

For example, the above-described embodiment utilizes Mach-Zehnder atomic interference in which one splitting, one reversal, and one mixing are performed using three moving standing light waves; the atomic interferometer of the present invention is not limited to such an embodiment, and it may be implemented as an embodiment, for example, using multi-stage Mach-Zehnder atomic interference in which more than one splitting, more than one reversal, and more than one mixing are performed. See Reference literature 2 for such multi-stage Mach-Zehnder atomic interference. (Reference literature 2) Takatoshi Aoki et al., "High-finesse atomic multiple-beam interferometer comprised of copropagating stimulated Raman-pulse fields," Phys. Rev. A 63, 063611 (2001)—Published 16 May 2001.

Further, the atomic interferometer of the present invention is not limited to the Mach-Zehnder atomic interferometer, and it may be, for example, a Ramsey-Bordé atomic interferometer.

In the above-described embodiments, the cold atomic beam generator 130y (y∈{a, b}) has the configuration including the 2D⁺-MOT mechanism. However, the cold atomic beam generator 130y is not limited to the configuration including the 2D⁺-MOT mechanism because the cold atomic beam generator 130y may use a pushing laser beam to generate a cold atomic beam from atoms trapped in space. The cold atomic beam generator 130y may have, for example, a configuration including an LUIS mechanism (for example, Reference literature 3), a configuration including a 2D-MOT mechanism (for example, Reference literature 4), a configuration including a 2D-HP MOT mechanism (for example, Reference literature 5), or a configuration for generating a cold atomic beam by using a laser beam and a pyramidal perforated retroreflector (for example, Reference literature 6).

(Reference literature 3) Z. Lu, K. Corwin, M. Renn, M. Anderson, E. Cornell and C. Wieman: "Low-Velocity Intense Source of Atoms from a Magneto-optical Trap," Phys. Rev. Lett., 77, 16, pp. 3331-3334 (1996).

(Reference literature 4) J. Schoser, A. Batar, R. Low, V. Schweikhard, A. Grabowski, Yu. B. Ovchinnikov, and T. Pfau, "Intense source of cold Rb atoms from a pure two-dimensional magneto-optical trap," PHYSICAL REVIEW A, 66, 023410 2002.

(Reference literature 5) Jia-Qiang Huang, Xue-Shu Yan, Chen-Fei Wu, Jian-Wei Zhang, and Li-Jun Wang, "Intense source of cold cesium atoms based on a two-dimensional magneto-optical trap with independent axial cooling and pushing," Chin. Phys. B Vol. 25, No. 6 063701 (2016).

(Reference literature 6) J. Arlt, O. Marago, S. Webster, S. Hopkins and C. Foot: "A pyramidal magnetooptical trap as a source of slow atoms," Opt. Commun., December, pp. 303-309 (1998).

Further, in the above-described embodiments, the atomic beam deflector 140y has the configuration including the 2D-MOT mechanism. However, since the atomic beam deflector 140y is required only to deflect the cold atomic beam from the cold atomic beam generator 130y, the atomic beam deflector 140y is not limited to the configuration including the 2D-MOT mechanism, and the atomic beam deflector 140y may have a configuration including, for example, a moving molasses mechanism.

To give a simple example, the moving molasses mechanism includes at least one pair of laser beams. The one pair of laser beams forms a moving standing light wave. The moving standing light wave imparts speeds to atoms in its drift direction. In the case that the moving molasses mechanism includes two pairs of laser beams, each pair forms a moving standing light wave. Atoms entering an intersection region of the two moving standing light waves are given speeds in a composite direction of the drift directions of the two moving standing light waves.

In that case that the atomic beam deflector 140y has a configuration including the moving molasses mechanism, the cold atomic beam generator 130y and the atomic beam deflector 140y has such a positional relationship that the course of the moving standing light wave in the moving molasses mechanism intersects (preferably orthogonally) with the course of the cold atomic beam from the cold atomic beam generator.

The cold atomic beam 131y and the leaking pushing laser beam 121y enter the atomic beam deflector 140y having the configuration including the moving molasses mechanism. From the above-described positional relationship between the cold atomic beam generator 130y and the atomic beam deflector 140y, the cold atomic beam 131y and the leaking pushing laser beam 121y obliquely intersect with the course of the moving standing light wave in the moving molasses mechanism of the atomic beam deflector 140y. Then, the traveling direction of the cold atomic beam 131y is changed by the principle of moving molasses. However, since the pushing laser beam 121y is not affected by the moving molasses mechanism, the traveling direction of the pushing laser beam 121y is not changed. Therefore, the atomic beam deflector 140y causes the cold atomic beam 131y to travel in a direction different from the traveling direction of the pushing laser beam 121y.

Supplement

The above conditions (1), (2), (a), and (b) will be described supplementarily. For example, when the atomic interferometer 800 is produced or transferred, the laser beams 511a and 511b and the atomic beams 131a and 131b do not exist in the atomic interferometer 800 at that time. However, the courses 503a and 503b of the laser beams 511a and 511b can be specified, for example, by the orientation of the laser beam emission ports or the angles of the mirrors. Furthermore, the courses 505a and 505b of the atomic beams 131a and 131b can be specified, for example, from the positional relationship among the cold atomic beam generation apparatuses 100a and 100b, the adjusters 500a and 500b, and the interference unit 200. In other words, even in a condition that the laser beams 511a and 511b and the atomic beams 131a and 131b do not exist, it is possible to determine whether each of the conditions (1) and (2) is satisfied. Furthermore, since the intensities, frequencies and so on of the laser beams 511a and 511b that can be generated by the laser beam generators 501a and 501b can be specified from the hardware configuration of the laser beam generators 501a and 501b, it is possible to determine whether each of the conditions (a) and (b) is satisfied even in a condition that the laser beams 511a and 511b and the atomic beams 131a and 131a 131b do not exist. Therefore, it is intended that the scopes of protection of the inertial sensor, the atomic interferometer, and the adjuster enumerated in Claims are not limited to those under conditions in which laser beams and atomic beams exist, but also expand to those under conditions in which neither laser beams nor atomic beams exist.

While the invention has been described with reference to the exemplary embodiments, it would be understood by those skilled in the art that various changes may be made and equivalents may be substituted for elements thereof without departing from the scope of the invention. In addition, many modifications may be made to adapt a particular system, device, or component thereof to the teachings of the invention without departing from the essential scope thereof. Therefore, it is intended that the invention not be limited to the particular embodiments disclosed for carrying out the present invention, but that the invention will include all embodiments falling within the scope of the appended claims.

Moreover, the use of the terms "first," "second," etc., if any, does not denote any order or importance, but rather the terms "first," "second," etc. are used to distinguish one element from another. The terminology used in the present specification is for the purpose of describing particular embodiments only and is not intended to limit the invention in any way. The term "comprising" and its conjugations, when used in the present specification and/or the appended claims, specify the presence of stated features, steps, operations, elements, and/or components, but do not preclude the presence or addition of one or more other features, steps, operations, elements, components, and/or groups thereof. The term "and/or", if any, includes any and all combinations of one or more of the associated listed elements. In the claims and the specification, unless otherwise noted, the terms "connect", "couple", "join", "link", or synonyms therefor and all the word forms thereof, if any, do not necessarily deny the presence of one or more intermediate elements between two elements, for instance, two elements "connected" or "coupled" to each other or "linked" to each other.

Unless otherwise defined, all terms (including technical terms and scientific terms) used in the present specification have the same meaning as commonly understood by those skilled in the art to which the invention belongs. Moreover, terms, such as those defined in commonly used dictionaries, should be interpreted as having a meaning that is consistent with their meaning in the context of the relevant arts and the present disclosure, and should not interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the present specification and claims should be read with the understanding that such combinations are entirely within the scope of the invention and the claims.

The corresponding structures, materials, acts, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

DESCRIPTION OF REFERENCE NUMERALS

100a Cold atomic beam generation apparatus
100b Cold atomic beam generation apparatus 101a Partition
101b Partition
110a Atom source
110b Atom source
121a Pushing laser beam
121b Pushing laser beam
130a Cold atomic beam generator
130b Cold atomic beam generator
140a Atomic beam deflector
140b Atomic beam deflector
131a Cold atomic beam
131b Cold atomic beam
131c Cold atomic beam
131d Cold atomic beam
200 Interference unit
200a First moving standing light wave
200b Second moving standing light wave
200c Third moving standing light wave
300 Moving standing light wave generator
400a Monitor
400b Monitor
408a Probe light
408b Probe light
409a Photodetector
409b Photodetector
500a Adjuster
500b Adjuster
501a Laser beam generator
501b Laser beam generator
503a Course
503b Course
505a Approach path
505b Approach path
507a Exit path
507b Exit path
511a Laser beam
511b Laser beam
800 Atomic interferometer
900 Inertial sensor
$S_n$ Spatial region

What is claimed is:

1. An inertial sensor comprising:
a first cold atomic beam generation apparatus to continuously generate a first atomic beam cooled;
a second cold atomic beam generation apparatus to continuously generate a second atomic beam cooled;
a first adjuster to make speeds of first atoms contained in the first atomic beam close to a first predetermined speed and bending a course of the first atomic beam;
a second adjuster to make speeds of second atoms contained in the second atomic beam close to a second predetermined speed and bending a course of the second atomic beam;
a moving standing light wave generator to generate three or more moving standing light waves;
an interference unit to obtain a third atomic beam resulting from interaction between the first atomic beam from the first adjuster and the three or more moving standing light waves, and a fourth atomic beam resulting from interaction between the second atomic beam from the second adjuster and the three or more moving standing light waves;
a first monitor to observe the third atomic beam from the interference unit; and
a second monitor to observe the fourth atomic beam from the interference unit,
wherein the first adjuster comprises a laser beam generator to generate $M_1$ laser beams satisfying the following conditions A), B) and C), where $M_1$ is a predetermined integer satisfying $3 \leq M_1$, and the second adjuster comprises a laser beam generator to generate $M_2$ laser beams satisfying the following conditions D), E) and F), where $M_2$ is a predetermined integer satisfying $3 \leq M_2$:

A) a course of each of the $M_1$ laser beams intersects with an approach path of the first atomic beam to the first adjuster;
B) a component, in a direction perpendicular to the approach path of the first atomic beam to the first adjuster, of a sum of radiation pressure vectors that the $M_1$ laser beams respectively have is non-zero;
C) a component, in a direction of the approach path of the first atomic beam to the first adjuster, of the sum of the radiation pressure vectors that the $M_1$ laser beams respectively have is negative for the first atoms having speeds greater than the first predetermined speed, and positive for the first atoms having speeds smaller than the first predetermined speed;
D) a course of each of the $M_2$ laser beams intersects with an approach path of the second atomic beam to the second adjuster;
E) a component, in a direction perpendicular to the approach path of the second atomic beam to the second adjuster, of a sum of radiation pressure vectors that the $M_2$ laser beams respectively have is non-zero; and
F) a component, in a direction of the approach path of the second atomic beam to the second adjuster, of the sum of the radiation pressure vectors that the $M_2$ laser beams respectively have is negative for the second atoms having speeds greater than the second predetermined speed, and positive for the second atoms having speeds smaller than the second predetermined speed.

2. An atomic interferometer comprising:
a first cold atomic beam generation apparatus to continuously generate a first atomic beam cooled;
a second cold atomic beam generation apparatus to continuously generate a second atomic beam cooled;
a first adjuster to make speeds of first atoms contained in the first atomic beam close to a first predetermined speed and bending a course of the first atomic beam;
a second adjuster to make speeds of second atoms contained in the second atomic beam close to a second predetermined speed and bending a course of the second atomic beam;
a moving standing light wave generator to generate three or more moving standing light waves; and
an interference unit to obtain a third atomic beam resulting from interaction between the first atomic beam from the first adjuster and the three or more moving standing light waves, and a fourth atomic beam resulting from interaction between the second atomic beam from the second adjuster and the three or more moving standing light waves,
wherein the first adjuster comprises a laser beam generator to generate $M_1$ laser beams satisfying the following conditions A), B) and C), where $M_1$ is a predetermined integer satisfying $3 \leq M_1$, and the second adjuster comprises a laser beam generator to generate $M_2$ laser beams satisfying the following conditions D), E) and F), where $M_2$ is a predetermined integer satisfying $3 \leq M_2$:

A) a course of each of the $M_1$ laser beams intersects with an approach path of the first atomic beam to the first adjuster;

B) a component, in a direction perpendicular to the approach path of the first atomic beam to the first adjuster, of a sum of radiation pressure vectors that the $M_1$ laser beams respectively have is non-zero;

C) a component, in a direction of the approach path of the first atomic beam to the first adjuster, of the sum of the radiation pressure vectors that the $M_1$ laser beams respectively have is negative for the first atoms having speeds greater than the first predetermined speed, and positive for the first atoms having speeds smaller than the first predetermined speed;

D) a course of each of the $M_2$ laser beams intersects with an approach path of the second atomic beam to the second adjuster;

E) a component, in a direction perpendicular to the approach path of the second atomic beam to the second adjuster, of a sum of radiation pressure vectors that the $M_2$ laser beams respectively have is non-zero; and F) a component, in a direction of the approach path of the second atomic beam to the second adjuster, of the sum of the radiation pressure vectors that the $M_2$ laser beams respectively have is negative for the second atoms having speeds greater than the second predetermined speed, and positive for the second atoms having speeds smaller than the second predetermined speed.

3. The atomic interferometer according to claim 2, wherein the first cold atomic beam generation apparatus comprises:

a first atom source;

a first cold atomic beam generator to generate, by using a first pushing laser beam, the first atomic beam from atoms trapped in space, the atoms being from the first atom source; and a first atomic beam deflector that the first atomic beam from the first cold atomic beam generator enters, and the first atomic beam deflector comprises a two-dimensional magneto-optical trapping mechanism or a moving molasses mechanism, a course of the first atomic beam from the first cold atomic beam generator matches a course of the first pushing laser beam, in a case that the first atomic beam deflector comprises the two-dimensional magneto-optical trapping mechanism, a zero magnetic field line of a quadrupole magnetic field in the two-dimensional magneto-optical trapping mechanism intersects with the course of the first atomic beam from the first cold atomic beam generator, and in a case that the first atomic beam deflector comprises the moving molasses mechanism, a course of a standing light wave in the moving molasses mechanism intersects with the course of the first atomic beam from the first cold atomic beam generator.

4. The atomic interferometer according to claim 2, wherein the second cold atomic beam generation apparatus comprises:

a second atom source;

a second cold atomic beam generator to generate, by using a second pushing laser beam, the second atomic beam from atoms trapped in space, the atoms being from the second atom source; and a second atomic beam deflector that the second atomic beam from the second cold atomic beam generator enters, and the second atomic beam deflector comprises a two-dimensional magneto-optical trapping mechanism or a moving molasses mechanism, a course of the second atomic beam from the second cold atomic beam generator matches a course of the second pushing laser beam, in a case that the second atomic beam deflector comprises the two-dimensional magneto-optical trapping mechanism, a zero magnetic field line of a quadrupole magnetic field in the two-dimensional magneto-optical trapping mechanism intersects with the course of the second atomic beam from the second cold atomic beam generator, and in a case that the second atomic beam deflector comprises the moving molasses mechanism, a course of a standing light wave in the moving molasses mechanism intersects with the course of the second atomic beam from the second cold atomic beam generator.

5. The atomic interferometer according to claim 3, wherein the second cold atomic beam generation apparatus comprises:

a second atom source;

a second cold atomic beam generator to generate, by using a second pushing laser beam, the second atomic beam from atoms trapped in space, the atoms being from the second atom source; and a second atomic beam deflector that the second atomic beam from the second cold atomic beam generator enters, and the second atomic beam deflector comprises a two-dimensional magneto-optical trapping mechanism or a moving molasses mechanism, a course of the second atomic beam from the second cold atomic beam generator matches a course of the second pushing laser beam, in a case that the second atomic beam deflector comprises the two-dimensional magneto-optical trapping mechanism, a zero magnetic field line of a quadrupole magnetic field in the two-dimensional magneto-optical trapping mechanism intersects with the course of the second atomic beam from the second cold atomic beam generator, and in a case that the second atomic beam deflector comprises the moving molasses mechanism, a course of a standing light wave in the moving molasses mechanism intersects with the course of the second atomic beam from the second cold atomic beam generator.

6. An apparatus for making speeds of atoms contained in an atomic beam close to a predetermined speed and bending a course of the atomic beam, the apparatus comprising:

a laser beam generator to generate M laser beams satisfying the following conditions A), B) and C), where M is a predetermined integer satisfying $3 \leq M$;

A) a course of each of the M laser beams intersects with an approach path of the atomic beam;

B) a component, in a direction perpendicular to the approach path of the atomic beam, of a sum of radiation pressure vectors that the M laser beams respectively have is non-zero; and C) a component, in a direction of the approach path of the atomic beam, of the sum of the radiation pressure vectors that the M laser beams respectively have is negative for the atoms having speeds greater than the predetermined speed, and positive for the atoms having speeds smaller than the predetermined speed.

7. The apparatus according to claim 6, wherein M=4,
intensities of the four laser beams are equal to one another,
the four laser beams are superposed in one predetermined spatial region through which the atomic beam passes,
wave vectors $k_1$, $k_2$, $k_3$, and $k_4$ are respectively expressed by

[Formula 16]

$$k_1 = \frac{(\alpha+\eta)e_v + \beta e_1}{2}$$

$$k_2 = \frac{(\alpha+\eta)e_v + \beta e_1}{2}$$

$$k_3 = \frac{-(\alpha+\eta)e_v + \gamma e_2}{2}$$

$$k_4 = \frac{-(\alpha+\eta)e_v + \gamma e_2}{2},$$

where $e_v$ is a unit direction vector in the direction of the approach path of the atomic beam, $e_1$ and $e_2$ are arbitrary unit direction vectors in directions each perpendicular to the unit direction vector $e_v$, $\alpha>0$, $\beta>0$, $\gamma>0$, and $\eta>0$, and
frequency $f_1$, $f_2$, $f_3$ and $f_4$ are respectively expressed by

[Formula 17]

$$f_1 = f_0 + \delta + v_d k_1 \cdot e_v$$

$$f_2 = f_0 + \delta + v_d k_2 \cdot e_v$$

$$f_3 = f_0 + \delta + v_d k_3 \cdot e_v$$

$$f_4 = f_0 + \delta + v_d k_4 \cdot e_v$$

where $v_d$ is the predetermined speed, $f_1$ is a frequency of a laser beam of the wave vector $k_1$, $f_2$ is a frequency of a laser beam of the wave vector $k_2$, $f_3$ is a frequency of a laser beam of the wave vector $k_3$, $f_4$ is a frequency of a laser beam of the wave vector $k_4$, and $\delta<0$.

8. The apparatus according to claim 7, wherein cos $(\pi/4) \leq |\cos \theta_1| < 1$, cos $(\pi/4) \leq |\cos \theta_2| < 1$, cos $(\pi/4) \leq |\cos \theta_3| < 1$ and cos $(\pi/4) \leq |\cos \theta_4| < 1$, where $\theta_1$ is an angle between the unit direction vector $e_v$ and the wave vector $k_1$, $\theta_2$ is an angle between the unit direction vector $e_v$ and the wave vector $k_2$, $\theta_3$ is an angle between the unit direction vector $e_v$ and the wave vector $k_3$, and $\theta_4$ is an angle between the unit direction vector $e_v$ and the wave vector $k_2$.

9. The apparatus according to claim 6, wherein M=3,
intensities of the three laser beams are equal to one another,
the three laser beams are superposed in one predetermined spatial region through which the atomic beam passes,
wave vectors $k_1$, $k_2$, and $k_3$ are respectively expressed by

[formula 18]

$$k_1 = -2\eta_n e_v - 2\beta e$$

$$k_2 = (\alpha+\eta)e_v + \beta e$$

$$k_3 = -(\alpha-\eta)e_v + \beta e$$

where $e_v$ is a unit direction vector in the direction of the approach path of the atomic beam, e is an arbitrary unit direction vector in a direction perpendicular to the unit direction vector $e_v$, $\alpha>0$, $\beta>0$, $\gamma>0$, and $\eta>0$, and
frequency $f_1$, $f_2$, and $f_3$ are respectively expressed by

[Formula 19]

$$f_1 = f_0 + \delta + v_d k_1 \cdot e_v$$

$$f_2 = f_0 + \delta + v_d k_2 \cdot e_v$$

$$f_3 = f_0 + \delta + v_d k_3 \cdot e_v$$

where $v_d$ is the predetermined speed, $f_1$ is a frequency of a laser beam of the wave vector $k_1$, $f_2$ is a frequency of a laser beam of the wave vector $k_2$, and $f_3$ is a frequency of a laser beam of the wave vector $k_3$, and $\delta<0$.

10. The apparatus according to claim 9, wherein cos $(\pi/4) \leq |\cos \theta_2| < 1$, and cos $(\pi/4) \leq |\cos \theta_3| < 1$, where $\theta_2$ is an angle between the unit direction vector $e_v$ and the wave vector $k_2$, and $\theta_3$ is an angle between the unit direction vector $e_v$ and the wave vector $k_3$.

11. The apparatus according to claim 6, wherein the atomic beam is a cold atomic beam, the cold atomic beam being composed of atoms whose speeds in a direction perpendicular to a course of the cold atomic beam are suppressed.

12. The apparatus according to claim 7, wherein the atomic beam is a cold atomic beam, the cold atomic beam being composed of atoms whose speeds in a direction perpendicular to a course of the cold atomic beam are suppressed.

13. The apparatus according to claim 8, wherein the atomic beam is a cold atomic beam, the cold atomic beam being composed of atoms whose speeds in a direction perpendicular to a course of the cold atomic beam are suppressed.

14. The apparatus according to claim 9, wherein the atomic beam is a cold atomic beam, the cold atomic beam being composed of atoms whose speeds in a direction perpendicular to a course of the cold atomic beam are suppressed.

15. The apparatus according to claim 10, wherein the atomic beam is a cold atomic beam, the cold atomic beam being composed of atoms whose speeds in a direction perpendicular to a course of the cold atomic beam are suppressed.

* * * * *

UNITED STATES PATENT AND TRADEMARK OFFICE
CERTIFICATE OF CORRECTION

PATENT NO. : 12,259,244 B2
APPLICATION NO. : 18/028952
DATED : March 25, 2025
INVENTOR(S) : Kento Taniguchi et al.

It is certified that error appears in the above-identified patent and that said Letters Patent is hereby corrected as shown below:

In the Specification

Column 5, Line 3, "light σ⁻ (where σ⁻ corresponding" should read --light σ⁻ (where σ⁻ corresponding--.

Column 5, Line 19, "light σ⁻ that travel" should read --light σ⁻ that travel--.

Column 7, Line 34, "δⱼ–kⱼ·v" should read --δⱼ-kⱼ·v--.

Column 7, around Line 40 (Formula 1),

"$$F_j = \frac{1}{2}\frac{I_j/I_{sat}}{1 + I_j/I_{sat} + (\delta_j - k_j \cdot v)^2/(\Gamma/2)^2}(2\pi\Gamma)bk_j \qquad (1)$$" should read --$$\mathbf{F}_j = \frac{1}{2}\frac{I_j/I_{sat}}{1 + I_j/I_{sat} + (\delta_j - \mathbf{k}_j \cdot \mathbf{v})^2/(\Gamma/2)^2}(2\pi\Gamma)\hbar \mathbf{k}_j \qquad (1)$$--.

Column 8, Line 13, "δⱼ–k·v" should read --δⱼ-kⱼ·v--.

Column 8, around Line 65 (Formula 4),

"$$\sum_{j=1}^{M}(F_j) \simeq \frac{1}{2}\frac{I/I_{sat}}{1 + I/I_{sat} + \delta^2/(\Gamma/2)^2}(2\pi\Gamma)\hbar \qquad (6)$$

$$\sum_{j=1}^{M}k_j\frac{1}{2}\frac{2I/I_{sat}}{(\Gamma/2)^2(1 + I/I_{sat} + \delta^2/(\Gamma/2)^2)^2}(2\pi\Gamma)\hbar\delta\sum_{j=1}^{M}(k_j \cdot v)k_j$$" should read Signed and Sealed this
Third Day of June, 2025

Coke Morgan Stewart
*Acting Director of the United States Patent and Trademark Office*

$$\sum_{j=1}^{M} \mathbf{F}_j \simeq \frac{1}{2} \frac{I/I_{sat}}{1+I/I_{sat}+\delta^2/(\Gamma/2)^2}(2\pi\Gamma)\hbar \sum_{j=1}^{M} \mathbf{k}_j$$
$$+ \frac{1}{2} \frac{2I/I_{sat}}{(\Gamma/2)^2(1+I/I_{sat}+\delta^2/(\Gamma/2)^2)^2}(2\pi\Gamma)\hbar\delta \sum_{j=1}^{M}(\mathbf{k}_j \cdot \mathbf{v})\mathbf{k}_j \quad (6)$$

-- --.

Column 9, Line 23, "ne{1, ..., N}" should read --n∈{1, ..., N}--.

Column 9, around Line 35 (Formula 6),

"
$$k_{4n-3} = \frac{(\alpha_n + \eta_n)e_v + \beta_n e_{n,1}}{2} \quad (10)$$

$$k_{4n-2} = \frac{(\alpha_n + \eta_n)e_v + \beta_n e_{n,1}}{2} \quad (11)$$

$$k_{4n-1} = \frac{-(\alpha_n + \eta_n)e_v + \gamma_n e_{n,2}}{2} \quad (12)$$

$$k_{4n} = \frac{-(\alpha_n + \eta_n)e_v + \gamma_n e_{n,2}}{2} \quad (13)$$
" should read $$\mathbf{k}_{4n-3} = \frac{(\alpha_n + \eta_n)\mathbf{e}_v + \beta_n \mathbf{e}_{n,1}}{2} \quad (10)$$

$$\mathbf{k}_{4n-2} = \frac{(\alpha_n - \eta_n)\mathbf{e}_v - \beta_n \mathbf{e}_{n,1}}{2} \quad (11)$$

$$\mathbf{k}_{4n-1} = \frac{-(\alpha_n - \eta_n)\mathbf{e}_v + \gamma_n \mathbf{e}_{n,2}}{2} \quad (12)$$

$$\mathbf{k}_{4n} = \frac{-(\alpha_n + \eta_n)\mathbf{e}_v - \gamma_n \mathbf{e}_{n,2}}{2} \quad (13)$$

-- --.

Column 9, Line 66, "($|v|-v_d)e_v$" should read --$(|v|-v_d)e_v$--.

Column 10, Line 44, "$|\theta_j|\neq 0$" should read --$|\theta_j|\neq 0$--.

Column 10, Line 44, "$\alpha_n-\eta_n\neq 0$" should read --$\alpha_n-\eta_n\neq 0$--.

Column 11, Line 11, "(4n–1)-th" should read --(4n-1)-th--.

Column 12, Line 31, "|θ$_j$|≠θ" should read --|θ$_j$|≠0--.

Column 12, Line 31, "α$_n$–η$_n$≠0" should read --α$_n$-η$_n$≠0--.

Column 12, around Line 50 (Formula 15),

"
$$f_{3n-2} = \frac{f_0 + \delta}{1 - \frac{v_d}{c}\cos\theta_{3n-2}} \quad (36)$$

$$f_{3n-1} = \frac{f_0 + \delta}{1 - \frac{v_d}{c}\cos\theta_{3n-1}} \quad (37)$$

$$f_{3n} = \frac{f_0 + \delta}{1 - \frac{v_d}{c}\cos\theta_{3n}} \quad (38)$$
" should read $$f_{3n-2} = \frac{f_0 + \delta}{1 - \frac{v_d}{c}\cos\theta_{3n-2}} \quad (36)$$

$$f_{3n-1} = \frac{f_0 + \delta}{1 - \frac{v_d}{c}\cos\theta_{3n-1}} \quad (37)$$

$$f_{3n} = \frac{f_0 + \delta}{1 + \frac{v_d}{c}\cos\theta_{3n-1}} \quad (38)$$

--.

Column 12, Line 57, "(3n–2)-th laser beam, (3n–1)-th" should read --(3n-2)-th laser beam, (3n-1)-th--.

Column 13, Line 13, "the natural width F" should read --the natural width Γ--.

Column 13, Line 16, "δ=–Γ/2" should read --δ=-Γ/2--.

Column 13, Lines 19-20, "θ$_{4n-3}$=π/4–Δ, θ$_{4n-2}$=–π/4–Δ, θ$_{4n-1}$=3π/4–Δ, θ$_{4n}$=–3π/4–Δ (here, A represents" should read --θ$_{4n-3}$=π/4-Δ, θ$_{4n-2}$=-π/4-Δ, θ$_{4n-1}$=3π/4-Δ, θ$_{4n}$=-3π/4-Δ (here, Δ represents--.

CERTIFICATE OF CORRECTION (continued)
U.S. Pat. No. 12,259,244 B2

Column 15, Line 44, "|e, p+h(k₁–k₂)>" should read --|e, p+h(k$_1$-k$_2$)>--.

Column 15, Line 48, "p₁=p+h(k₁–k₂)" should read --p$_1$=p+h(k$_1$-k$_2$)--.

Column 15, Line 59, "|e, p+h(k₁–k₂)>" should read --|e, p+h(k$_1$-k$_2$)>--.

Column 15, Line 65, "|e, p+h(k₁–k₂)>" should read --|e, p+h(k$_1$-k$_2$)>--.

Column 16, Line 6, "|e, p+h(k₁–k₂)>" should read --|e, p+h(k$_1$-k$_2$)>--.

Column 16, Line 13, "|e, p+h(k₁–k₂)>" should read --|e, p+h(k$_1$-k$_2$)>--.

Column 16, Line 15, "|e, p+h(k₁–k₂)>" should read --|e, p+h(k$_1$-k$_2$)>--.

Column 16, Line 20, "p+h(k₁–k₂)>" should read --p+h(k$_1$-k$_2$)>--.

Column 16, Line 23, "|e, p+h(k₁–k₂)>" should read --|e, p+h(k$_1$-k$_2$)>--.

Column 16, Line 26, "|e, p+h(k₁–k₂)>" should read --|e, p+h(k$_1$-k$_2$)>--.

Column 16, Line 30, "(k₁–k₂)>" should read --(k$_1$-k$_2$)>--.

Column 16, Line 32, "|e, p+h(k₁–k₂)>" should read --|e, p+h(k$_1$-k$_2$)>--.

Column 16, Line 34, "|e, p+h(k₁–k₂)>" should read --|e, p+h(k$_1$-k$_2$)>--.

Column 16, Line 41, "is called it pulse" should read --is called π pulse--.

Column 16, Line 45, "|e, p+h(k₁–k₂)>" should read --|e, p+h(k$_1$-k$_2$)>--.

Column 16, Line 54, "|e, p+h(k₁–k₂)>" should read --|e, p+h(k$_1$-k$_2$)>--.

Column 16, Line 63, "p+h(k₁–k₂)>" should read --p+h(k$_1$-k$_2$)>--.

Column 16, Line 66, "|e, p+h(k₁–k₂)>" should read --|e, p+h(k$_1$-k$_2$)>--.

Column 17, Line 17, "|e, p+h(k₁–k₂)>" should read --|e, p+h(k$_1$-k$_2$)>--.

Column 18, Line 11, "Ramsey-Bord é" should read --Ramsey-Bordé--.

Column 18, Line 21, "LUIS" should read --LVIS--.

CERTIFICATE OF CORRECTION (continued)
U.S. Pat. No. 12,259,244 B2

In the Claims

Column 25, around Line 15 (Claim 7, around Line 15; Formula 16),

"$$k_1 = \frac{(\alpha+\eta)e_v + \beta e_1}{2}$$
$$k_2 = \frac{(\alpha+\eta)e_v + \beta e_1}{2}$$
$$k_3 = \frac{-(\alpha+\eta)e_v + \gamma e_2}{2}$$
$$k_4 = \frac{-(\alpha+\eta)e_v + \gamma e_2}{2}$$" should read --

$$\mathbf{k}_1 = \frac{(\alpha+\eta)\mathbf{e}_v + \beta \mathbf{e}_1}{2}$$
$$\mathbf{k}_2 = \frac{(\alpha-\eta)\mathbf{e}_v - \beta \mathbf{e}_1}{2}$$
$$\mathbf{k}_3 = \frac{-(\alpha-\eta)\mathbf{e}_v + \gamma \mathbf{e}_2}{2}$$
$$\mathbf{k}_4 = \frac{-(\alpha+\eta)\mathbf{e}_v - \gamma \mathbf{e}_2}{2}$$ --.